(12) United States Patent
Kadtke et al.

(10) Patent No.: US 6,732,064 B1
(45) Date of Patent: May 4, 2004

(54) DETECTION AND CLASSIFICATION SYSTEM FOR ANALYZING DETERMINISTIC PROPERTIES OF DATA USING CORRELATION PARAMETERS

(75) Inventors: James B. Kadtke, La Jolla, CA (US); Michael N. Kremliovsky, San Diego, CA (US)

(73) Assignee: Nonlinear Solutions, Inc., Stafford, VA (US)

(*) Notice: Subject to any disclaimer, the term of this patent is extended or adjusted under 35 U.S.C. 154(b) by 0 days.

(21) Appl. No.: 10/145,569

(22) Filed: May 13, 2002

Related U.S. Application Data

(60) Division of application No. 09/191,988, filed on Nov. 13, 1998, now Pat. No. 6,401,057, which is a continuation-in-part of application No. 09/105,529, filed on Jun. 26, 1998, now Pat. No. 6,278,961.

(60) Provisional application No. 60/051,579, filed on Jul. 2, 1997.

(51) Int. Cl.[7] .............................................. G06F 17/15
(52) U.S. Cl. .................................................... 702/189
(58) Field of Search .............................. 702/189, 22, 30, 702/196; 700/52; 703/2; 704/243

(56) References Cited

U.S. PATENT DOCUMENTS

| | | | | |
|---|---|---|---|---|
| 3,845,288 A | * | 10/1974 | Cornyn, Jr. et al. | .......... 702/45 |
| 3,924,235 A | * | 12/1975 | Heller et al. | .................. 342/75 |
| 4,912,765 A | * | 3/1990 | Virupaksha | .................. 704/229 |
| 5,057,992 A | * | 10/1991 | Traiger | .......................... 700/52 |
| 5,277,053 A | * | 1/1994 | McLane et al. | ......... 702/109 X |
| 5,619,432 A | * | 4/1997 | Chandler | .................... 702/189 |
| 5,727,128 A | * | 3/1998 | Morrison | ..................... 706/45 |
| 5,867,807 A | * | 2/1999 | Yamada et al. | ............... 702/30 |
| 6,035,223 A | * | 3/2000 | Baker, Jr. | ................... 600/323 |
| 6,124,134 A | * | 9/2000 | Stark | ........................... 436/63 |
| 6,564,176 B2 | * | 5/2003 | Kadtke et al. | .............. 702/189 |

FOREIGN PATENT DOCUMENTS

| | | | | |
|---|---|---|---|---|
| JP | 10-32494 | * | 2/1998 | ........... H03M/7/30 |

OTHER PUBLICATIONS

1992 IEEE Conference on Acoustics, Speech and Signal Processing Mar. 1992 vol. 5, pp. 321–324 "Nonlinear Signal Processing Using Empirical Gl–bal Dynamical Equations", Jeffrey S. Brush et al.*

* cited by examiner

Primary Examiner—Thomas P. Noland
(74) Attorney, Agent, or Firm—Robroy R. Fawcett

(57) ABSTRACT

A signal detection and classification technique that provides robust decision criteria for a wide range of parameters and signals in the presence of noise and interfering signals. The technique uses dynamical models for deriving filters and classifiers optimized for a particular category of signals of interest. The dynamical filters and classifiers can be implemented based on nonlinear dynamical principles. The invention is able to efficiently reveal deterministic properties of observed data signals in a numerically fast and efficient manner.

3 Claims, 30 Drawing Sheets

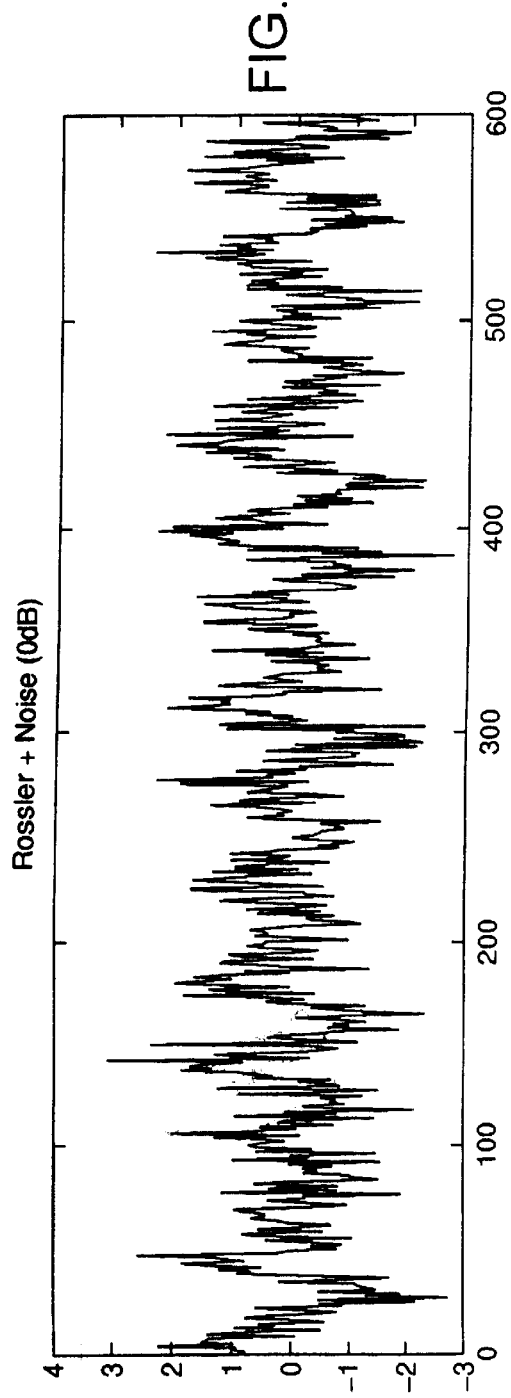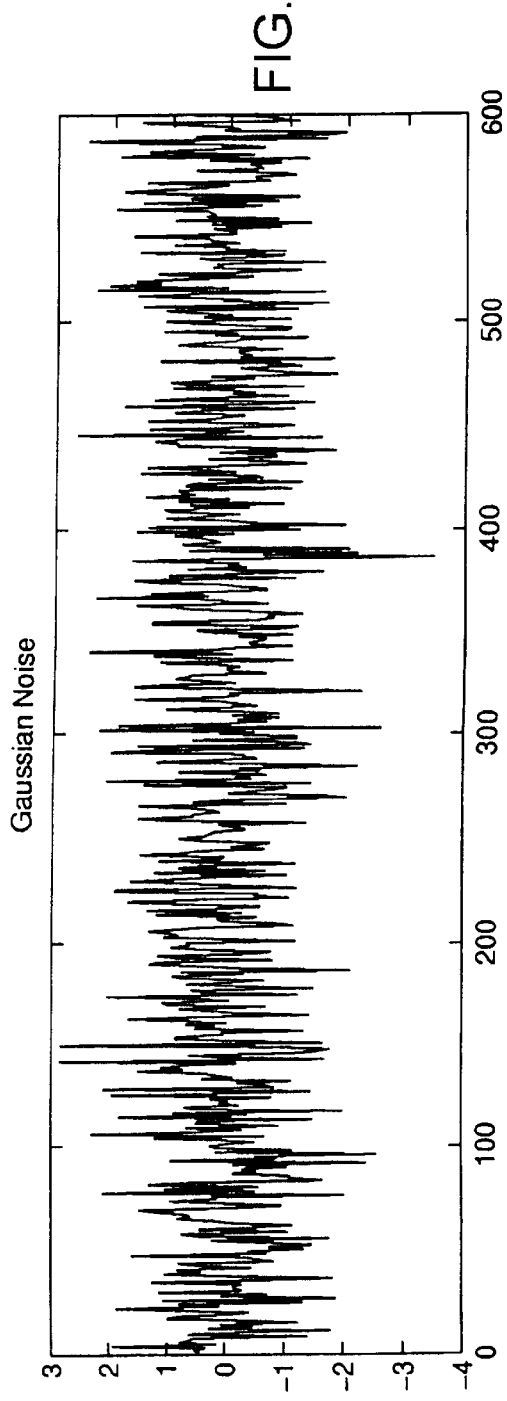

DETECTION AND CLASSIFICATION SYSTEM FOR ANALYZING DETERMINISTIC PROPERTIES OF DATA USING CORRELATION PARAMETERS

CROSS-REFERENCES TO RELATED APPLICATIONS

This application is a divisional of U.S. patent application Ser. No. 09/191,988, filed Nov. 13, 1998, and titled DETECTION AND CLASSIFICATION SYSTEM FOR ANALYZING DETERMINISTIC PROPERTIES OF DATA USING CORRELATION PARAMETERS and now U.S. Pat. No. 6,401,057, which is a continuation-in-part of U.S. patent application Ser. No. 09/105,529, filed Jun. 26, 1998, and titled SIGNAL AND PATTERN DETECTION OR CLASSIFICATION BY ESTIMATION OF CONTINUOUS DYNAMICAL MODELS, now U.S. Pat. No. 6,278,961; which claims priority to U.S. provisional application Ser. No. 60/051,579, filed Jul. 2, 1997, and titled SIGNAL AND PATTERN DETECTION OR CLASSIFICATION BY ESTIMATION OF CONTINUOUS DYNAMICAL MODELS.

The U.S. Government has a paid-up license in this invention and the right in limited circumstances to require the patent owner to license others on reasonable terms as provided for by the terms of contract No. N00421-97-C-1048 awarded by the United States Navy.

FIELD OF THE INVENTION

The present invention relates to signal and pattern data detection and classification and, more particularly to data detection and classification using estimated nonlinear correlation parameters and dynamical correlation parameters that reflect possible deterministic properties of the observed data.

BACKGROUND OF THE INVENTION

Existing signal data detection and classification techniques generally use linear models derived from an integro-differential operator such as an ordinary differential equation or a partial differential equation. A set of model parameters are estimated using an optimization technique that minimizes a cost function, e.g. the least squares optimization technique. The model parameters can be used to replicate the signal and classification is applied to the replicated model.

Such signal data detection and classification techniques based on integro-differential operators are computationally intensive and have difficulty in environments having high levels of background noise or interfering signals. Existing techniques also typically fail to take advantage of physical information possibly derived from a signal generating system.

Accordingly, there exists a need for signal and pattern data detection and classification techniques that are computationally efficient and that can provide performance in environments subject to relatively high levels of background noise or interfering signals. The present invention satisfies these needs.

SUMMARY OF THE INVENTION

The present invention is a data detection and classification system for revealing aspects of information or observed data signals that reflect deterministic properties of the data signals. The deterministic properties of an observed data signal may be efficiently estimated, according to the invention, using correlation parameters based on nonlinear dynamical principles. The system is particularly advantageous for detecting and classifying observed data signals provided by complicated nonlinear dynamical systems and processes, which data signals may be spectrally broadband and very difficult to detect using standard signal processing and transform techniques.

The invention is embodied in a method, and related apparatus, for detecting and classifying signals in which a data signal is acquired from a dynamical system, normalized, and used to calculate at least one of a nonlinear or dynamical correlation coefficient. The correlation coefficient may result from a correlation between the normalized data signal and a derivative of the normalized data signal, or from a correlation between the normalized data signal and an exponent of the normalized signal wherein the exponent may be an integer of 2 or greater. Further, the data signal may be normalized to zero mean and unit variance.

Alternatively, the invention may be embodied in an apparatus, and related method, for processing an input signal wherein the apparatus has a first differentiator, a delay circuit and a first correlator. The first differentiator receives the input signal and generates a first derivative signal which is based on a derivative of the input signal. The delay circuit delays the input signal by a predetermined time period to generate a delayed signal and the first correlator correlates the delayed signal with the first derivative signal to generate a first correlated signal. The apparatus may further or alternatively include a first function generator and a second correlator. The first function generator may receive the input signal and generate a first processed signal based on a first predetermined function and the second correlator correlates the delayed signal with the first processed signal to generate a second correlated signal. Alternatively, the first function generator may generate the first processed signal using the first derivative signal. Further, the first predetermined function may be a square of the input signal received by the first function generator. Also, the correlated signals may be further processed to detect deterministic properties in the input signal.

The invention may be also embodied in a method, and related apparatus, for processing an analog input signal in which the analog input signal is digitized to generate a digital input signal and then normalized to a normalized digital signal. Next, correlation signals are calculated based on the normalized signal to generate a correlation matrix and a derivative of the correlation matrix is calculated to generate a derivative correlation coefficient matrix. Estimating coefficients are then calculated based on the correlation matrix and the derivative correlation coefficient matrix.

Other features and advantages of the present invention should be apparent from the following description of the preferred embodiments, taken in conjunction with the accompanying drawings, which illustrate, by way of example, the principles of the invention.

BRIEF DESCRIPTION OF THE DRAWINGS

FIG. 7A is a graph of an deterministic signal generated by a Rössler model in 0 dB Gaussian noise.

FIG. 7B is a graph a signal segment of pure Gaussian noise.

DETAILED DESCRIPTION OF THE PREFERRED EMBODIMENTS

As shown in the exemplary drawings, the present invention is embodied in a signal processing apparatus, and related method, for detecting and classifying aspects of dynamical information or observed data signals that reflect deterministic properties of the data signals using an efficient estimation technique for determining correlation parameters based on nonlinear dynamical principles. The signal processing apparatus implements a technique that is capable of detecting and classifying very general structure in the observed data. The technique is particularly advantageous for detecting and classifying observed data derived from complicated chaotic or nonlinear time evolution which may be spectrally broadband and very difficult to detect using any standard signal processing and transform methods.

The estimation technique may be applied to a wide variety of observed data for detailed characterization of transient (non-stationary) air or underwater signals, including acoustic signal classification for multi-class target recognition. Further, the correlation parameters may be selected to reveal deterministic properties based on nonlinear dynamical principles, or the correlation parameters may be based on heuristically selected nonlinear dynamical models represented by delayed and/or coupled differential equations.

The theoretical derivation of the correlation parameters and representative design methodologies for applying the derived correlation parameters are presented below. More specifically, several generally applicable techniques for estimating the correlation parameters are presented and then, based on practical considerations, the estimation techniques are generally applied to provide general architectures for signal processing. The following embodiments of signal processing apparatus of the invention are derived from the general architectures theoretically developed below.

Figure 1:
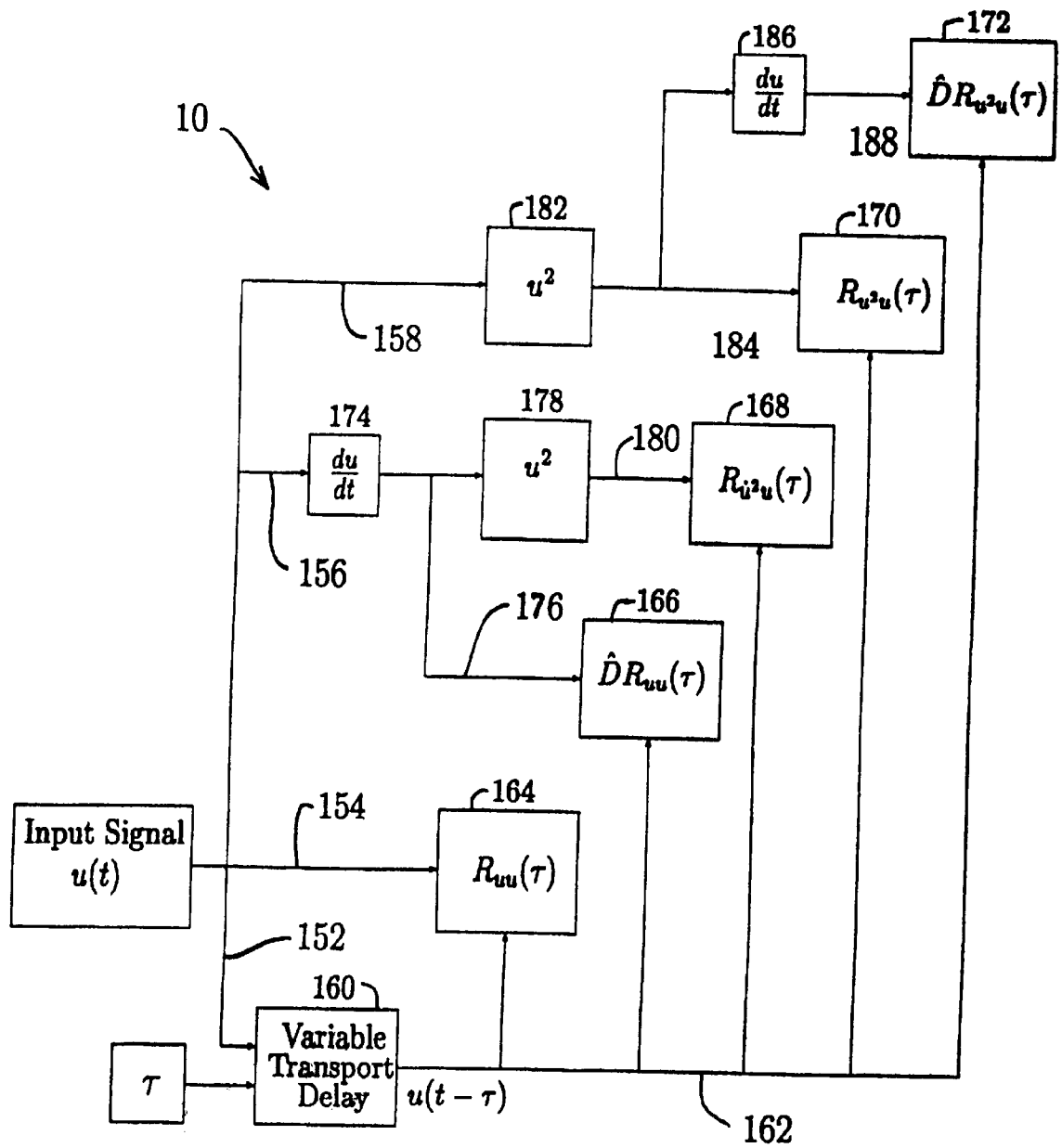
FIG. 1 is a block diagram of an analog signal processor for detecting and classifying deterministic properties of observed data using correlation parameters, according to the present invention.

The signal processing apparatus of the invention may be embodied in an analog circuit device 10, shown in FIG. 1, for providing general deterministic signal discrimination of general scalar input signals based on a delay-differential signal model up to a quadratic order. The analog circuit device is based on the architecture of Section 2.1 below, with the function transformation f(u) being set to $u^2$. The analog circuit device 10 estimates observed data feature correlations using a circuit of operational amplifiers and correlators. The analog circuit device provides high computational speed and efficiency. Visual inspection of the resulting correlation parameters also provides high speed classification by a human operator, or alternately, simple statistical tests may be used on the resulting correlation parameters to provide simple feature comparisons. An example input signal u(t) is provided to the analog circuit device using autonomous Van Der Pol circuit oscillations.

The analog circuit device 10 receives the input signal u(t) and provides it to a plurality of signal processing paths 152, 154, 156 and 158. In a first path 152, the input signal is delayed by a predetermined time period τ (tau) by a variable transport delay 160 to generate a delayed input signal u(t–τ). The variable transport delay may be implemented using a Digitally Programmable Delay Generator (Part No.: AD9500) available from Analog Devices, Inc. of Norwood, Mass. The delayed input signal u(t–τ) is provided by a signal path 162 to a series of correlators 164, 166, 168, 170 and 172 for correlation with the input signal or with processed forms of the input signal. The correlators each may be implemented using a CMOS Digital Output Correlator (Part No.: TMC2023) available from Fairchild Semiconductor, Inc. of South Portland, Me.

The first correlator 164 is provided with the input signal u(t) from the second signal processing path 154 and with the delayed input signal u(t–t) and generates a first correlation parameter signal based on a correlation of the input signals. The first correlation parameter signal is an autocorrelation of the input signal u(t) and is designated $R_{uu}(t)$ and corresponds to the correlation parameter of Eqn. 27 below.

A third signal path 156 is coupled to a derivative device 174 that generates from the input signal u(t) a derivative signal du/dt on a signal path 176. The derivative device is implemented using an operational amplifier (not shown) configured with resistor and capacitor elements as known in the art. The second correlator 116 receives the derivative signal du/dt and the delayed input signal u(t-\) and generates a second correlation parameter signal which is designated D^Ruu(t) and which corresponds to the correlation parameter of Eqn. 28 below.

The derivative signal du/dt is also provided to a squaring device 128 which generates a squared derivative signal $(du/dt)^2$ on a signal path 180. The third correlator 168 receives the squared derivative signal $(du/dt)^2$ and the delayed input signal u(t–∴) and generates a third correlation parameter signal which is designated $Ru_{u(dot)u}{}^2{}_u(\tau)$ and which corresponds to the correlation parameter of Eqn. 30 below.

The fourth signal path 158 is coupled to a squaring device 182 which generates a squared signal $u^2$ on a signal line 184. The fourth correlator 170 receives the squared signal from the squaring device and receives the delayed input signal u(t–∴) and generates a fourth correlation parameter signal which is designated $DR_u{}^2{}_u(\tau)$ and which corresponds to the correlation parameter of Eqn. 32 below. The squared signal is also provided to a derivative device 186 which generates a derivative squared signal on a signal line 188. The fifth correlator 172 receives the derivative squared signal $d(u^2)/dt$ and the delayed input signal u(t–∴) and generates a fifth correlation parameter signal which is designated $D\hat{\ }R_u{}^2{}_u(\tau)$ and which corresponds to the correlation parameter of Eqn. 34 below.

A prototype to simulate the operation of the analog circuit device 10 was implemented using the SIMULINK package from the Matlab toolbox. ("Matlab 5", scientific modeling and visualization software provided by The Math-Works Inc., Natick, Mass. 01760, USA, Phone: (508)-647-7001). The input signal u(t) was generated using the autonomous Van Der Pol oscillator based on the following equation (where x=u(t)):

$$\ddot{x} - \mu(1-x^2)\dot{x} + \omega_0^2 x = 0 \qquad \text{Eqn. 1.}$$

Figure 2A:
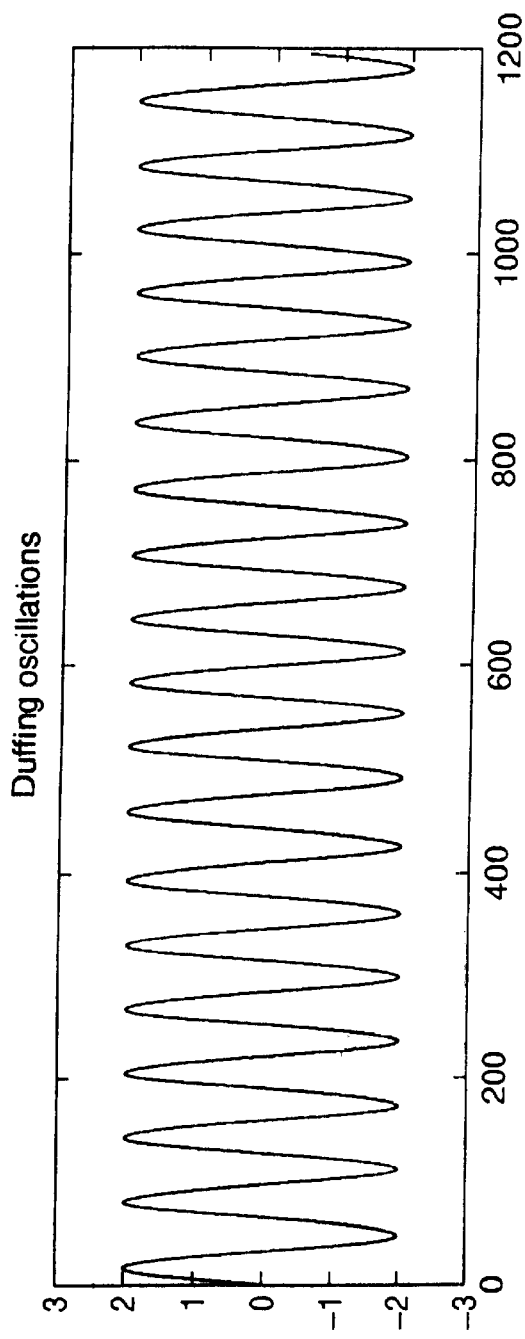
FIG. 2A is a graph of an input signal versus time, generated by an autonomous Van Der Pol oscillator having $\mu=0.2$ (linear regime), that is representative of observed data input into the analog signal processor of FIG. 1.
Figure 2B:
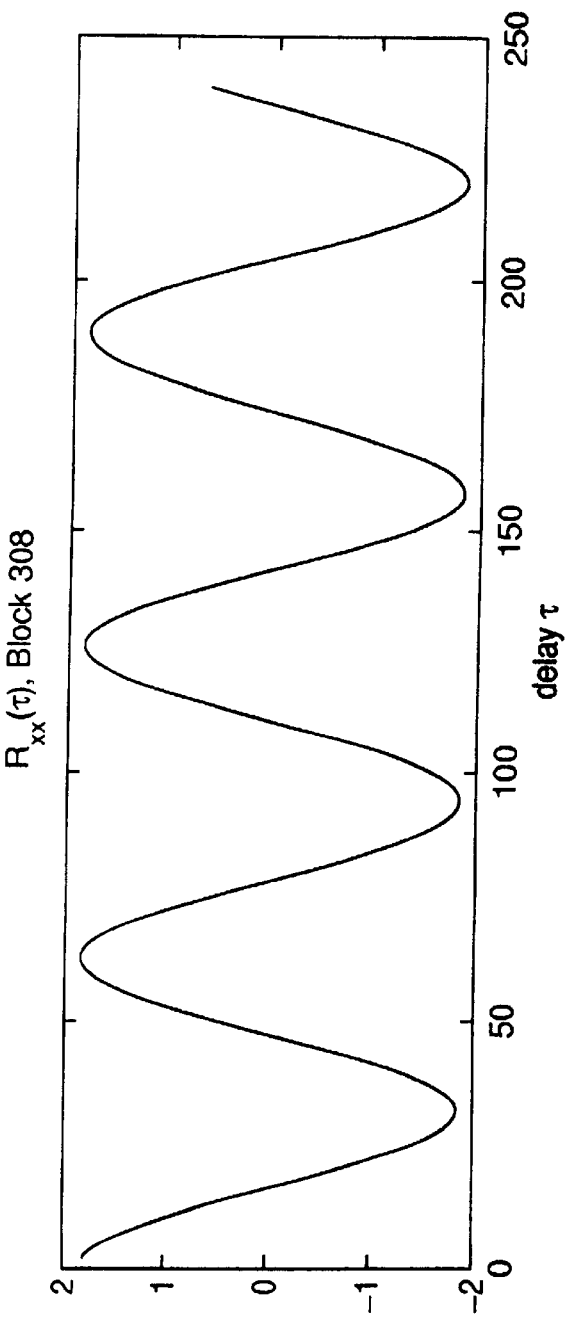
FIG. 2B is a graph of a correlation parameter versus time delay $\tau$, generated by an auto-correlator (block 164) of FIG. 1, based on the input signal of FIG. 2A.
Figure 2C:
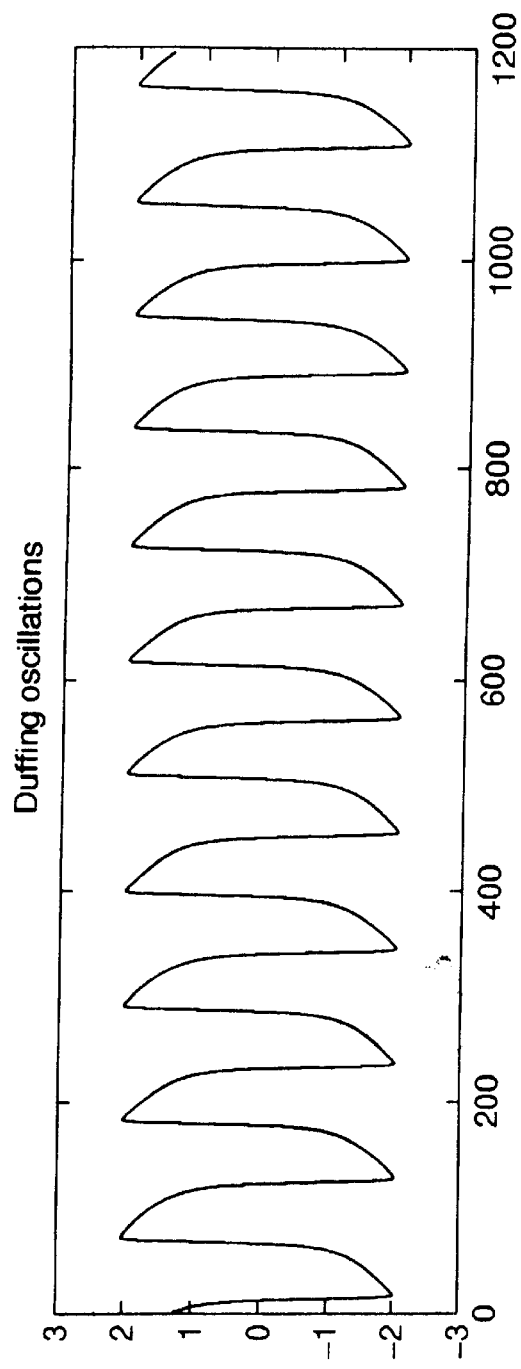
FIG. 2C is a graph of an input signal versus, generated by an autonomous Van Der Pol oscillator having $\mu=4.0$ (nonlinear regime), that is representative of observed data input into the analog signal processor of FIG. 1.
Figure 2D:
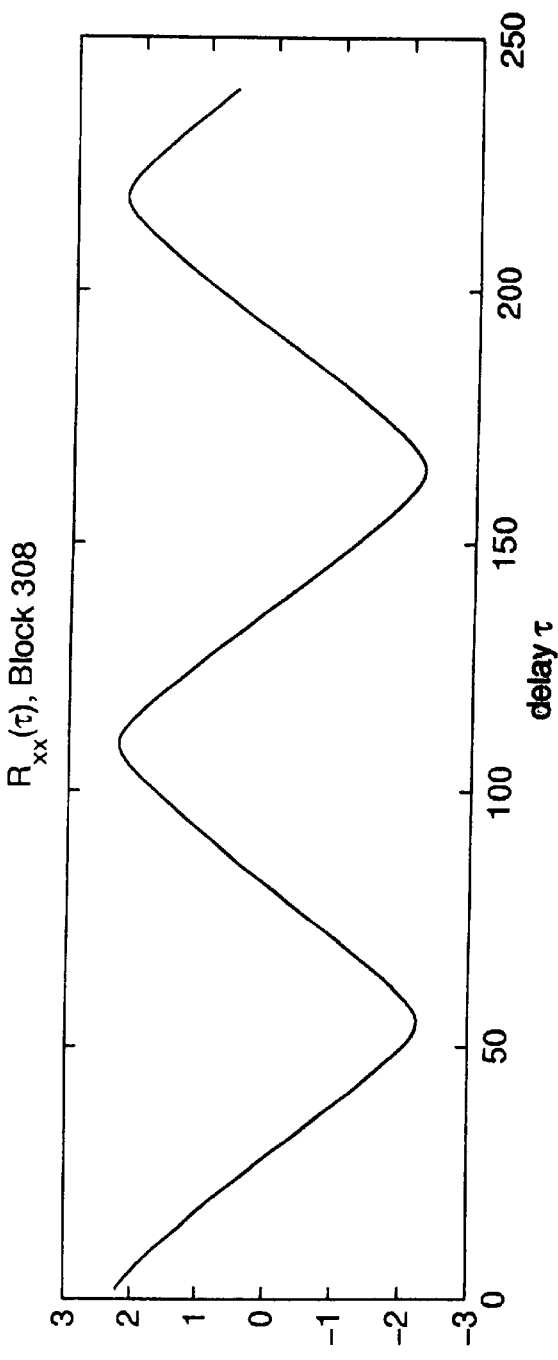
FIG. 2D is a graph of a correlation parameter versus time delay $\tau$, generated by an auto-correlator (block 164) of FIG. 1, based on the input signal of FIG. 2C.
Figure 3A:
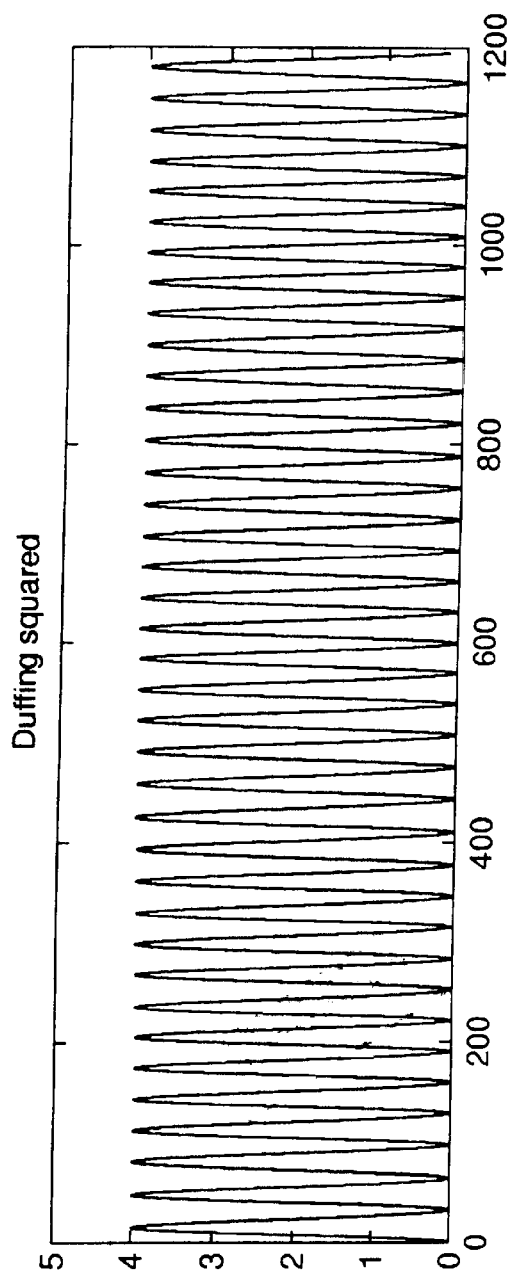
FIG. 3A is a graph of an output signal representing the square of the input signal of FIG. 2A generated by a squaring device (block 182) of FIG. 1.
Figure 3B:
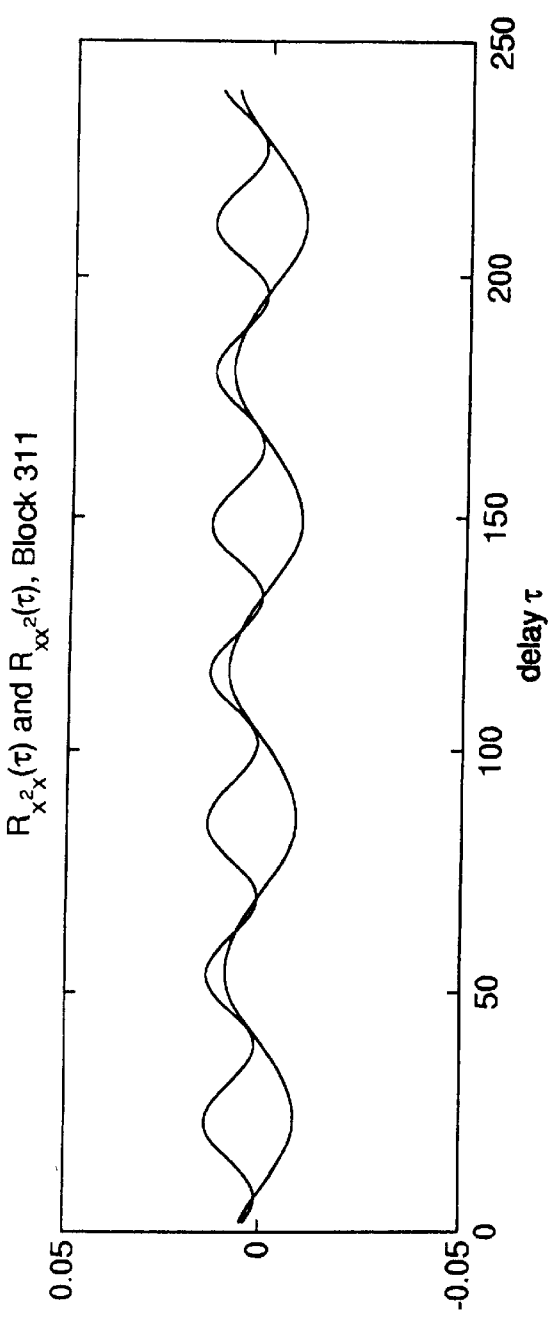
FIG. 3B is a graph of a correlation parameter generated by a correlator (block 170) of FIG. 1, based on the input signal of FIG. 2A and the squared signal of FIG. 3A.
Figure 3C:
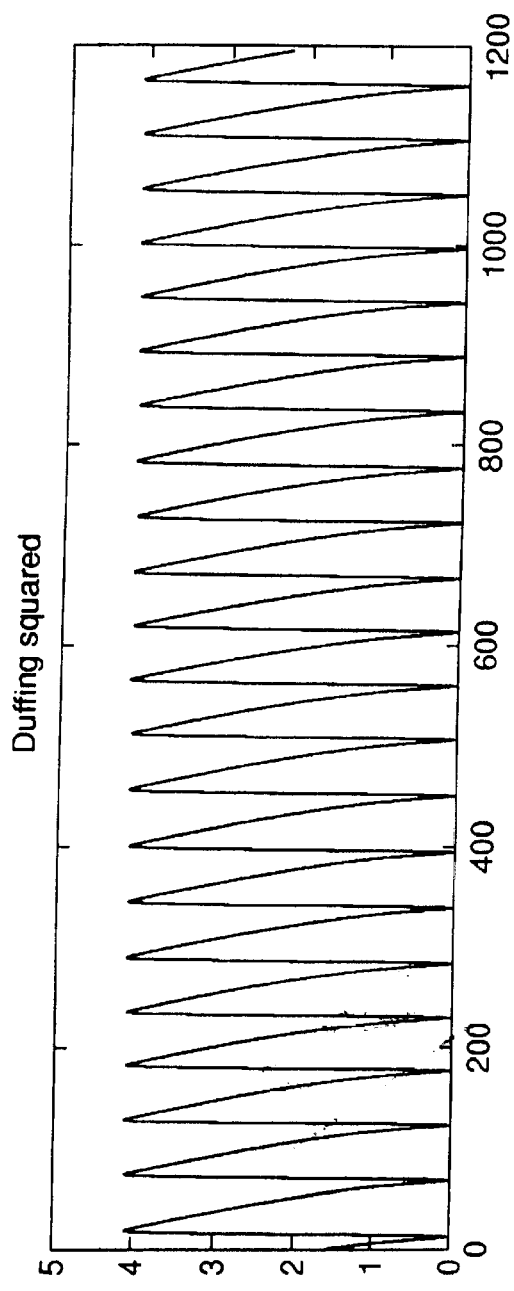
FIG. 3C is a graph of an output signal representing the square of the input signal of FIG. 2C generated by a squaring device (block 182) of FIG. 1.
Figure 3D:
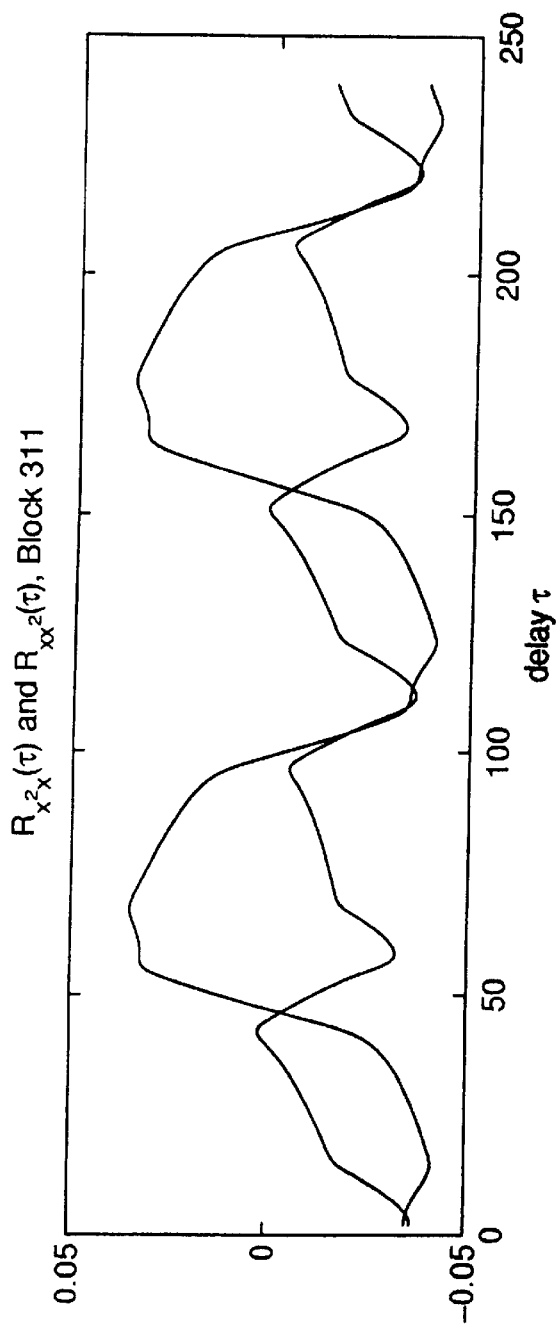
FIG. 3D is a graph of a correlation parameter generated by a correlator (block 170) of FIG. 1, based on the input signal of FIG. 2C and the squared signal of FIG. 3C.
Figure 4A:
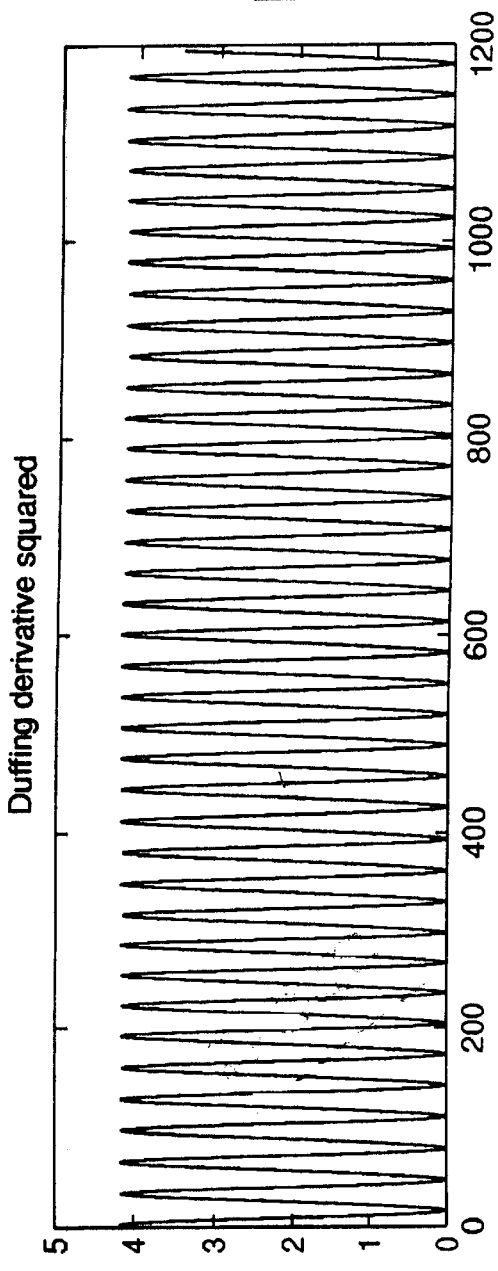
FIG. 4A is a graph of an output signal representing the square of the derivative of input signal of FIG. 2A generated by a derivative device (block 174) and a squaring device (block 178) of FIG. 1.
Figure 4B:
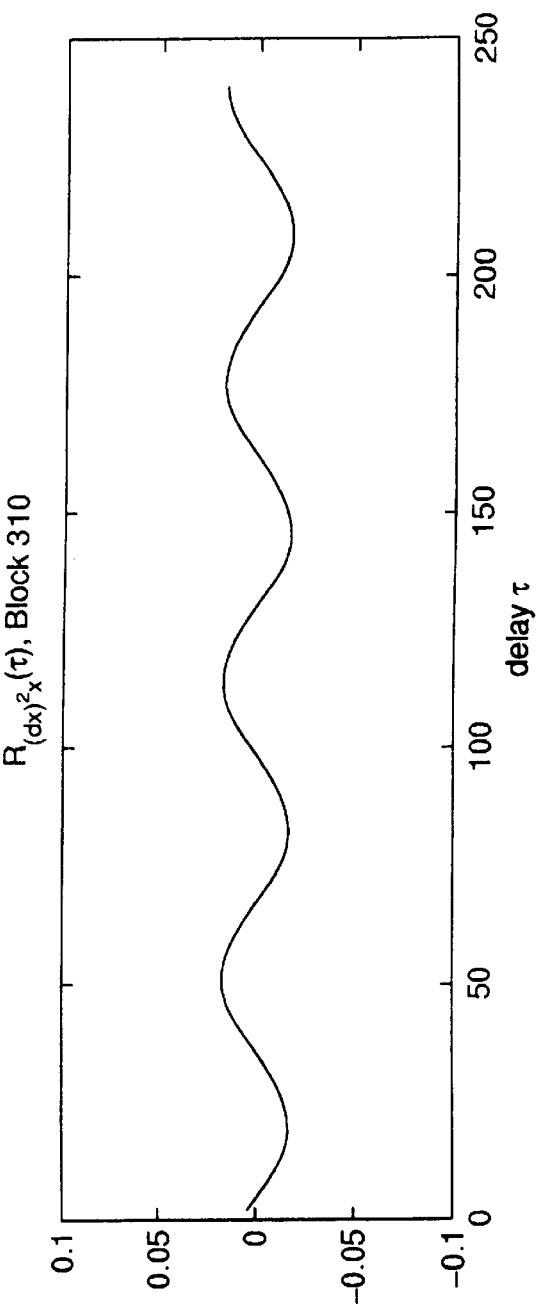
FIG. 4B is a graph of a correlation parameter generated by a correlator (block 168) of FIG. 1, based on the input signal of FIG. 2A and the squared derivative signal of FIG. 4A.
Figure 4C:
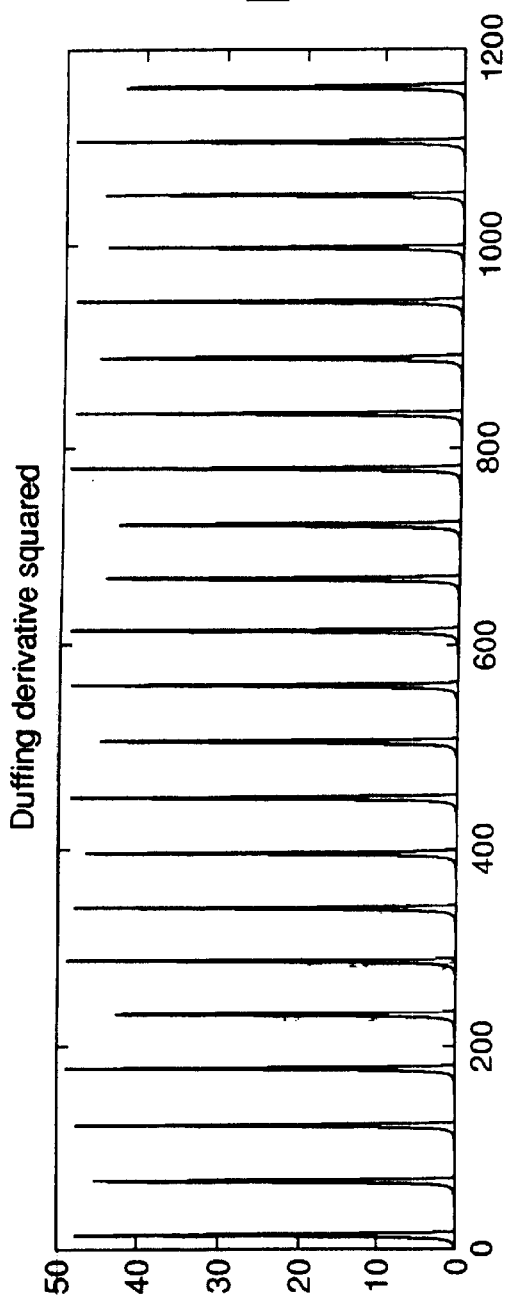
FIG. 4C is a graph of an output signal representing the square of the derivative of input signal of FIG. 2C generated by a derivative device (block 168) and a squaring device (block 178) of FIG. 1.
Figure 4D:
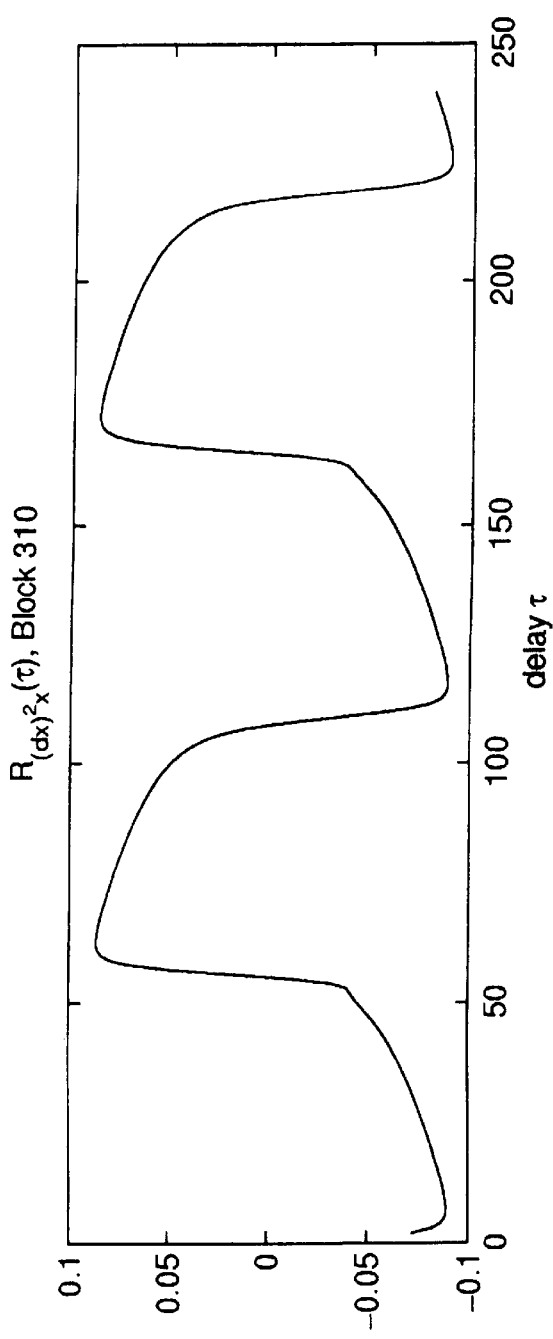
FIG. 4D is a graph of a correlation parameter generated by a correlator (block 168) of FIG. 1, based on the input signal of FIG. 2A and the squared derivative signal of FIG. 4C.

The parameter μ represents the nonlinear dissipation in the input signal. In the limit case of μ=0, the input signal evolves as a simple harmonic oscillator (FIG. 2A). For μ=4.0, the input signal is still periodic, but is significantly nonlinear (FIG. 2C).

The response of the analog circuit device 10 is demonstrated by the graphs shown in FIGS. 2–4. As discussed above, a graph of the amplitude of a simple harmonic oscillation signal, versus time delay τ, generated by the autonomous Van Der Pol oscillator, is shown in FIG. 2A. Shown in FIG. 3A is the square of the simple harmonic signal of FIG. 2A, versus time delay τ, generated by the squaring device (block 182). Shown in FIG. 4A is the derivative squared of the simple harmonic signal of FIG. 2A, versus time delay τ, generated by the derivative device (block 186). As discussed above, a graph of an oscillation signal exhibiting nonlinear properties, versus time τ, is shown in FIG. 2C. Shown in FIG. 3C is the squared nonlinear signal of FIG. 2C, versus time delay τ, generated by the squaring device (block 132). Shown in FIG. 4C is the derivative squared nonlinear signal of FIG. 2A, versus time delay τ, generated by the derivative device (block 186). In the linear regime (FIGS. 2A, 3A and 4A) the values of the correlations (FIGS. 2B, 3B and 4B) are very harmonic or sinusoidal and the values of the nonlinear correlations (FIGS. 3B and 4B) tend to be small, while in the nonlinear regime (FIGS. 2C, 3C and 4C) the values of the correlations (FIGS. 2D, 3D and 4D) have peculiar shapes and the nonlinear correlations are significantly larger.

A blind statistical test leads to the same result as the visual observation of the graphs. A T-test for different means for the correlations, shown in FIGS. 2–4, gives very high significance (I<0.0001) of the differences for each delay time considered separately.

Another embodiment of the invention based on a digital signal processing technique for revealing deterministic properties of observed data signals is shown with respect to FIGS. 5–8. The technique is implemented using a digital signal processor 20 (FIG. 5) that includes an analog-to-digital converter 202, a processor 204, read only memory (ROM) 206, random access memory (RAM) 208, a video driver 210, and a display 212. The digital signal processor may be implemented using a general purpose processor such as, for example, an IBM compatible personal computer using processing software such as Matlab supra. Alternately, the digital signal processor may be a special purpose processor, a gate array or a programmable digital processing unit such as the ADSP-210xx family of development tools provided by Analog Devices, Inc.

Figure 6:
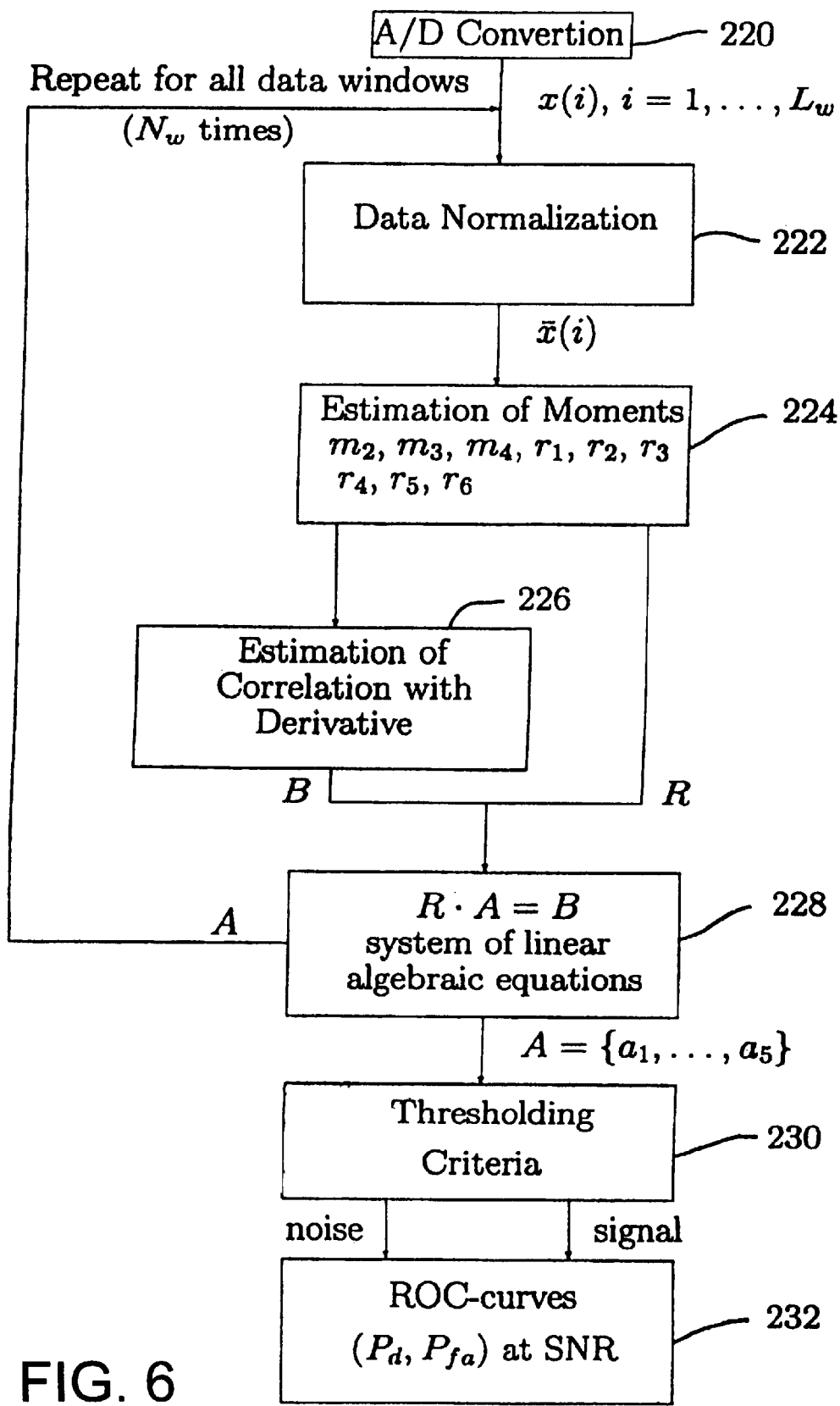
FIG. 6 is a flow chart showing a process for implementing, using the digital processor of FIG. 5, a simple digital detector for detecting determinism and/or nonlinearity, according to the present invention.

An analog signal is digitized by the A/D converter 202 generating a series of data values of length $L_w$ (block 220, FIG. 6). The data values are normalized (block 222) and used to calculated an estimation of moments (block 224). The normalization technique is discussed in more detail in Section 2.2 below. The estimates are derived from a dynamical model based on the delayed differential equation of Eqn. 9 below. The moment estimations forms a correlation matrix R of A Eqn. 23 below. An estimation of correlations with derivatives is used to estimate a derivative B matrix (block 226) of Eqn. 21 below. The individual derivative correlations are estimated using Eqns. 49–51 below. Next, the set of model coefficient parameters A are calculated (block 228) and the process repeated $N_w$ times for all data windows. The model coefficient parameters are provided to a threshold process (block 230). The threshold process uses existing discrimination techniques such as statistics and averaging to distinguish the deterministic signals from random noise (block 232).

To demonstrate the operation of this technique, a nonlinear data signal is generated using the following Rössler equations:

$$\dot{x}=-y-z$$

$$\dot{y}=x+0.2y$$

$$\dot{z}=0.5+xz-14z,$$

which describe a 3-component chemical reaction [Rössler, O.E. "An equation for continuous chaos", Physics Letters A 57A(5), p.397–8 (1976)]. The equations are integrated and the result sampled with $\Delta t=0.15$. The x-component of the Rossler signal is corrupted by the addition of a significant amount of Gaussian noise, shown in FIG. 7A, generated by the Matlab random function. A signal representing only Gaussian noise is shown in FIG. 7B.

Figure 8A:
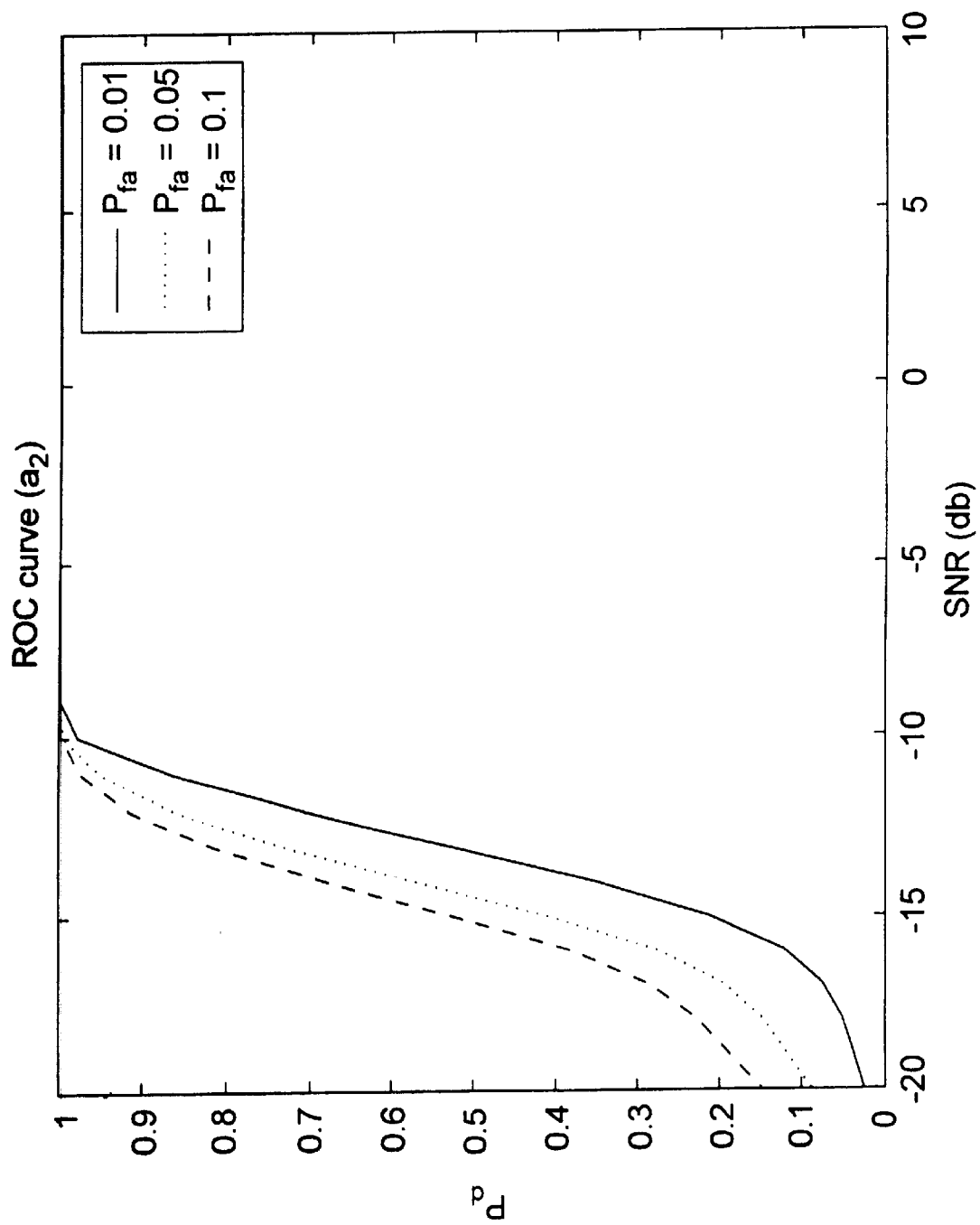
FIG. 8A is a graph of probability of detection for a linear model coefficient $a_2$ versus noise level in decibels for three levels of probability of false alarm.
Figure 8B:
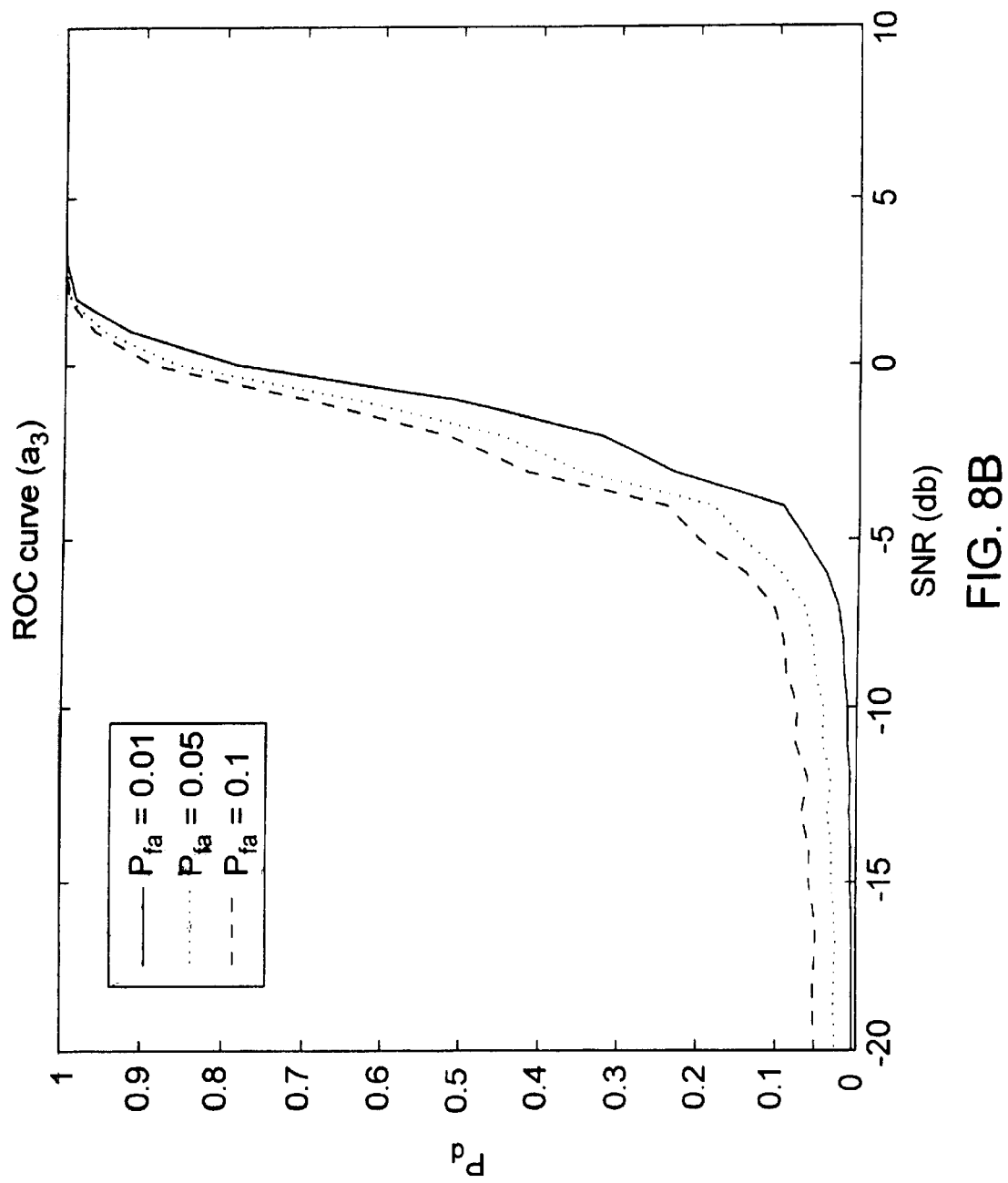
FIG. 8B is a graph of probability of detection for a nonlinear model coefficient $a_3$ versus noise level in decibels for three levels of probability of false alarm.

The output "receiver operating characteristics" (ROC) curves are shown in FIGS. 8 for $P_{fa}=0.01, 0.05, 0.1$. Note that $a_2$ is a linear coefficient of Appendix A Eqn. 9, whereas $a_3$ is a nonlinear coefficient. The coefficient $a_2$ may be used to detect determinism for very low SNR and coefficient $a_3$ is useful to detect nonlinearity for higher SNR. For example, if Pfa is restricted to less than 0.05 GM (5%), determinism can be detected with a probability almost 1, if $a_2>15$, while the same conditions provide a probability of detection 0.84, if nonlinear coefficient $a_3>0.7$. Further, the threshold values for coefficients $a_2$ and $a_3$ used to generate ROC curves of FIGS. 8A and 8B are shown in Table 1 (below) for 0 dB noise and different pairs of probability of detection $P_d$ and probability of false alarm $P_{fa}$. The parameters are 900 windows of Lw=800 points of the x-component of the Rossler equations, dt=0.155, τ=10 and d=5.

TABLE 1

|  | $P_{fa} = 0.01$ | $P_{fa} = 0.05$ | $P_{fa} = 0.1$ |
|---|---|---|---|
| $a_{2\ (Pd\ \pm\ 1)}$ | $a_2 = 14.62$ | $a_2 = 15.00$ | $a_2 = 15.19$ |
| $a_3$ | $a_3 = 0.50$ | $a_3 = 0.70$ | $a_3 = 0.80$ |
|  | ($P_d = 0.75$) | ($P_d = 0.84$) | ($P_d = 0.87$) |

Figure 5:
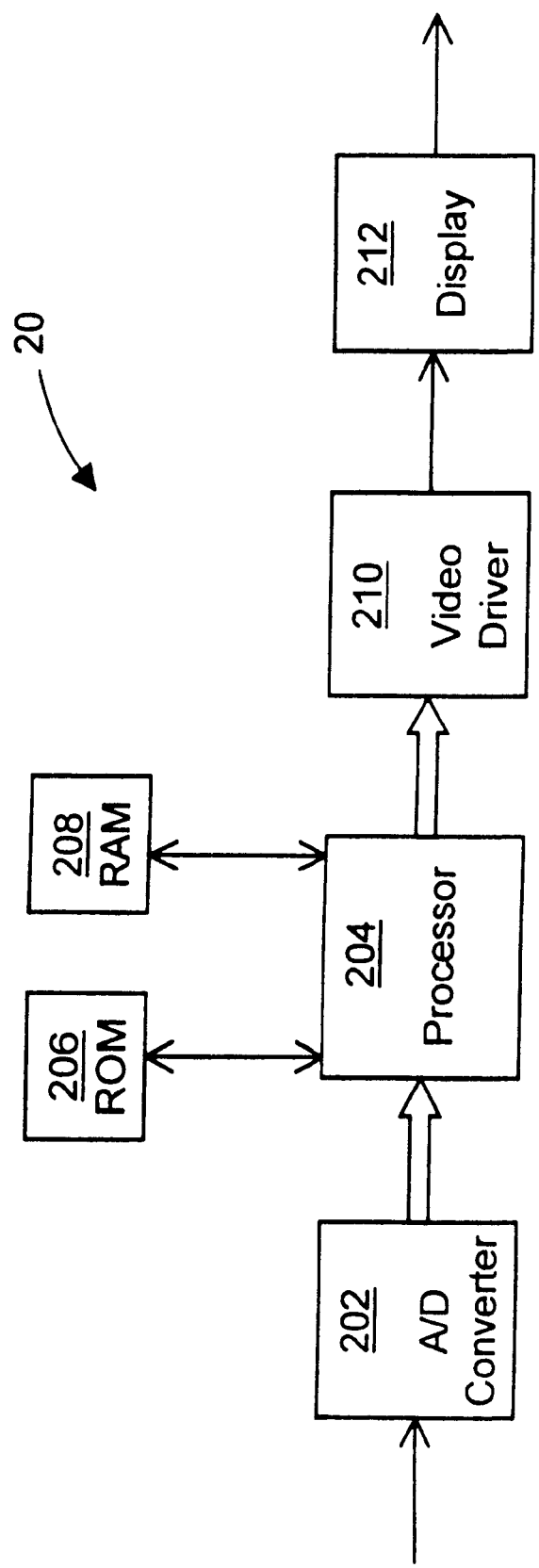
FIG. 5 is a block diagram of a digital signal processor for detecting and classifying deterministic properties of observed data using correlation parameters that are based on nonlinear dynamical principles, according to the present invention.
Figure 9:
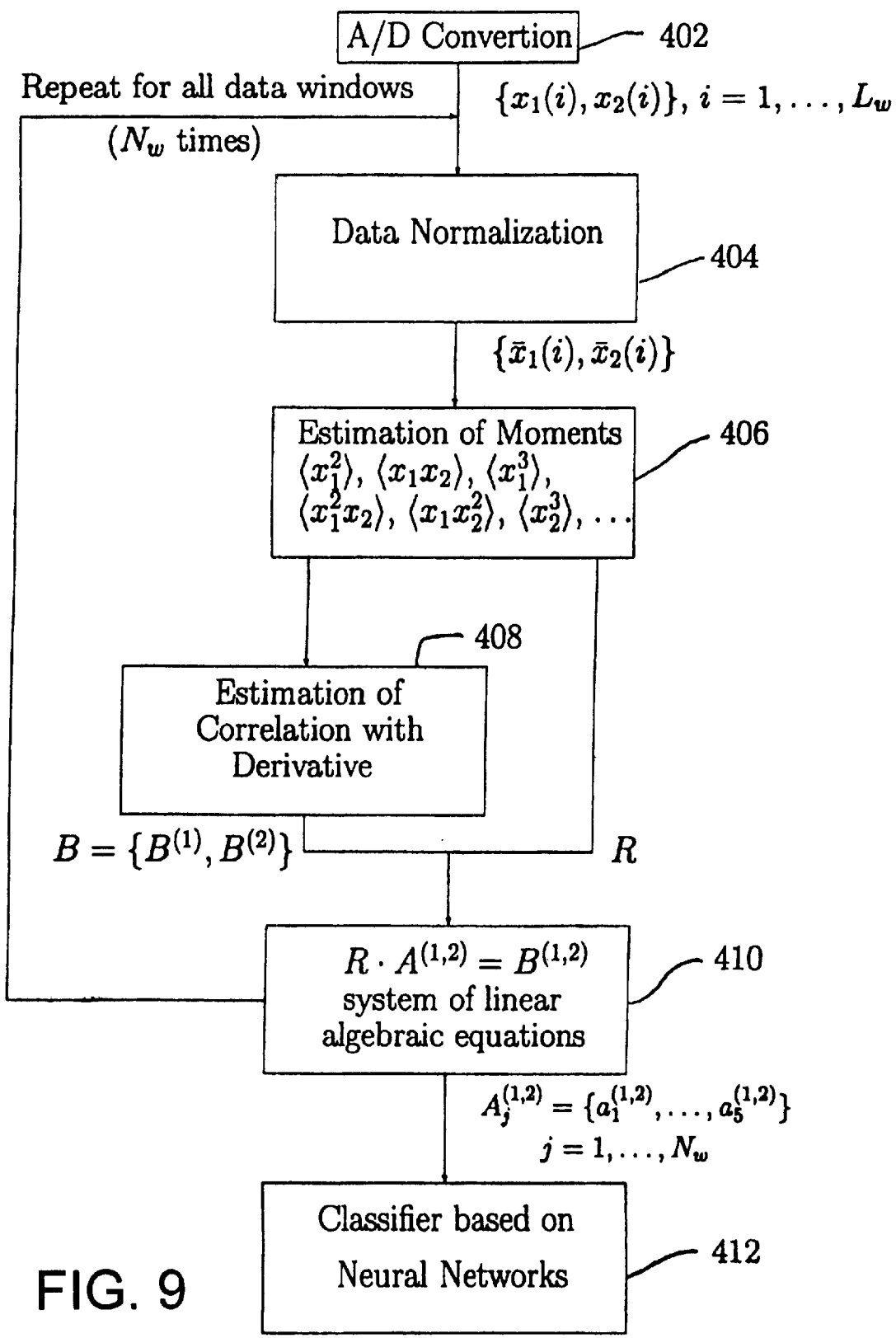
FIG. 9 is a flow chart showing a process for implementing an acoustic signal classifier for multi-class target recognition, using the digital processor of FIG. 5, according to the present invention.
Figure 10A:
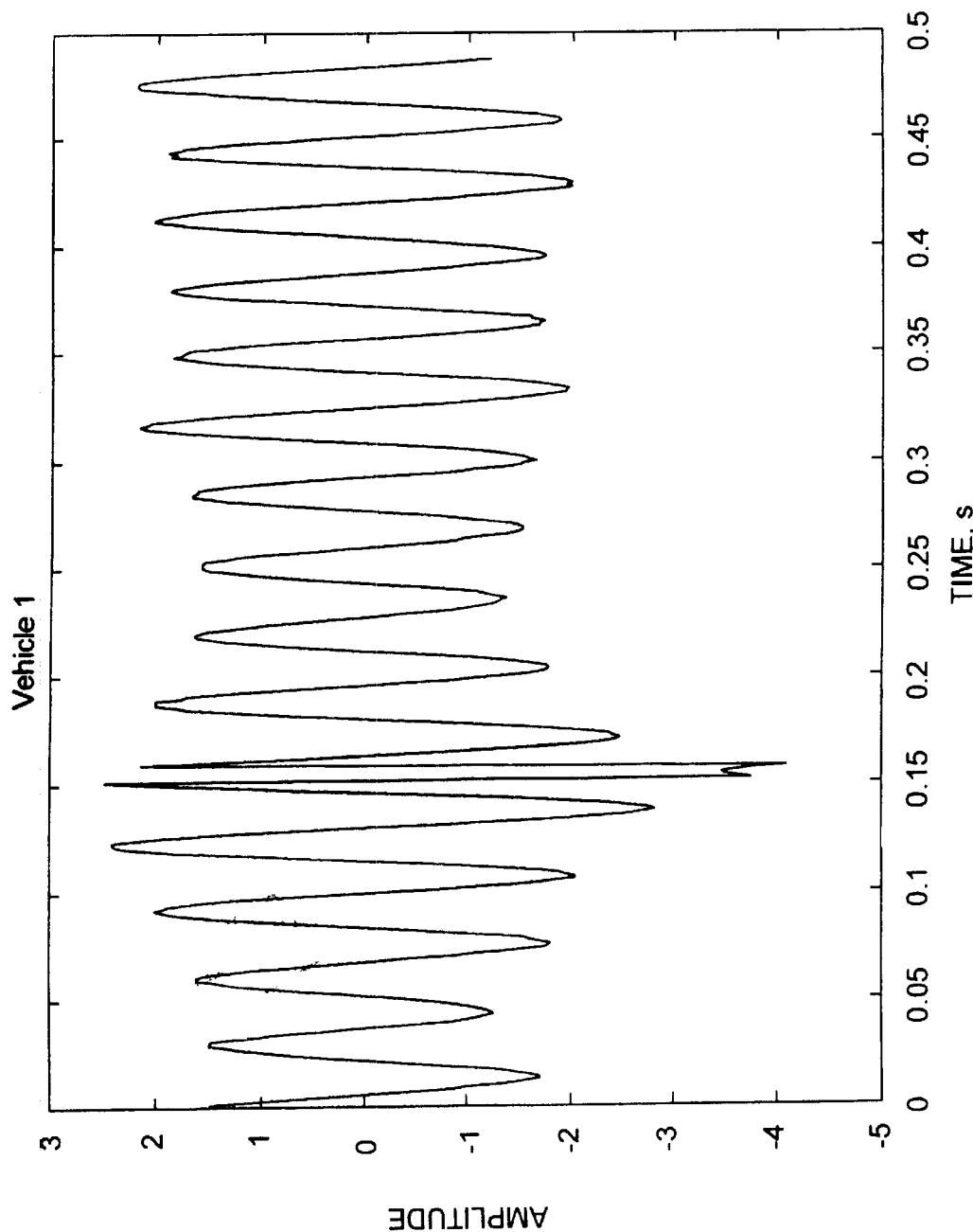
FIGS. 10A–F are graphs of acoustic amplitude, versus time, of six differing mobile land vehicles, respectively, approaching a closet point of approach from left at a speed of 15 miles per hour.
Figure 10B:
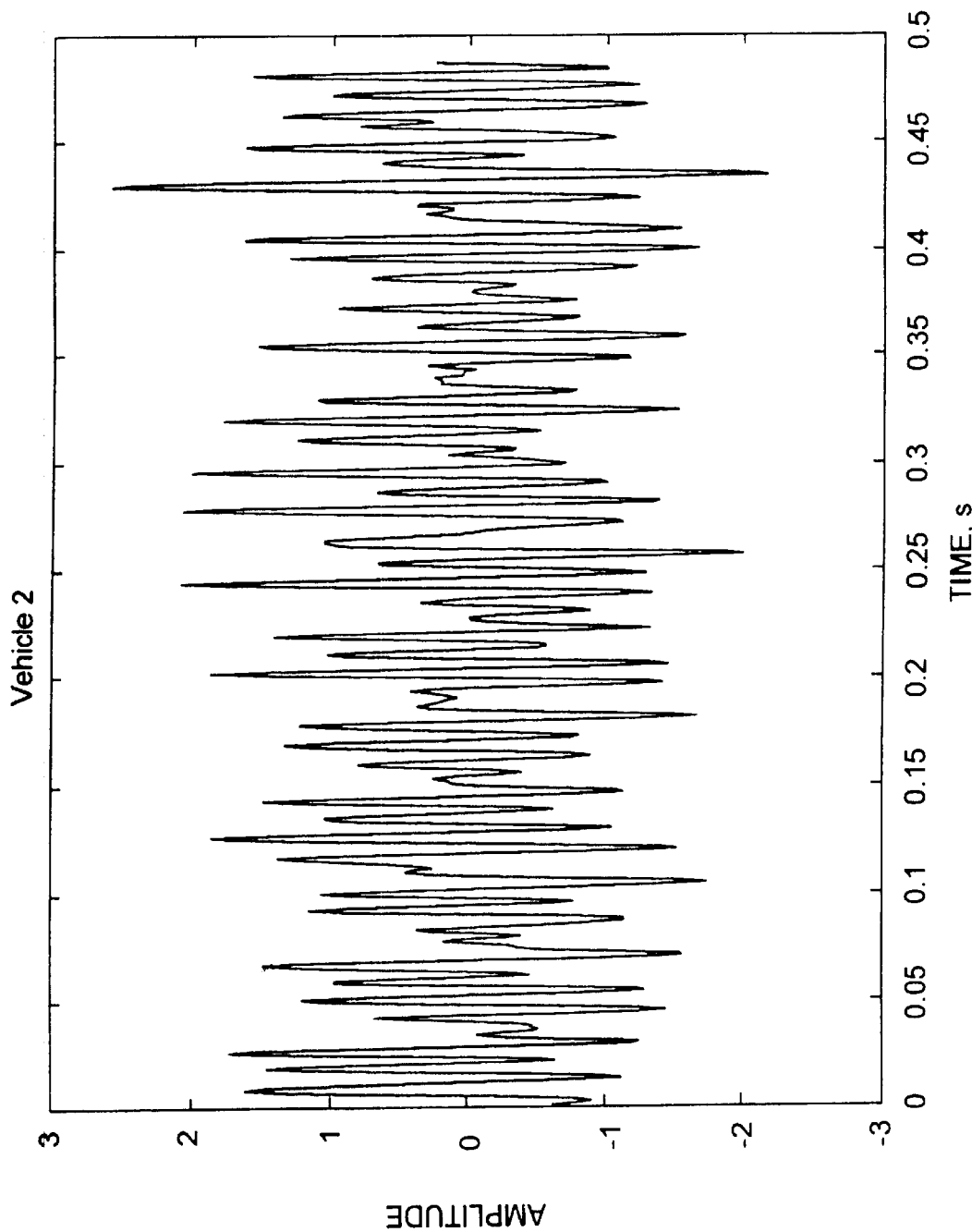
Figure 10C:
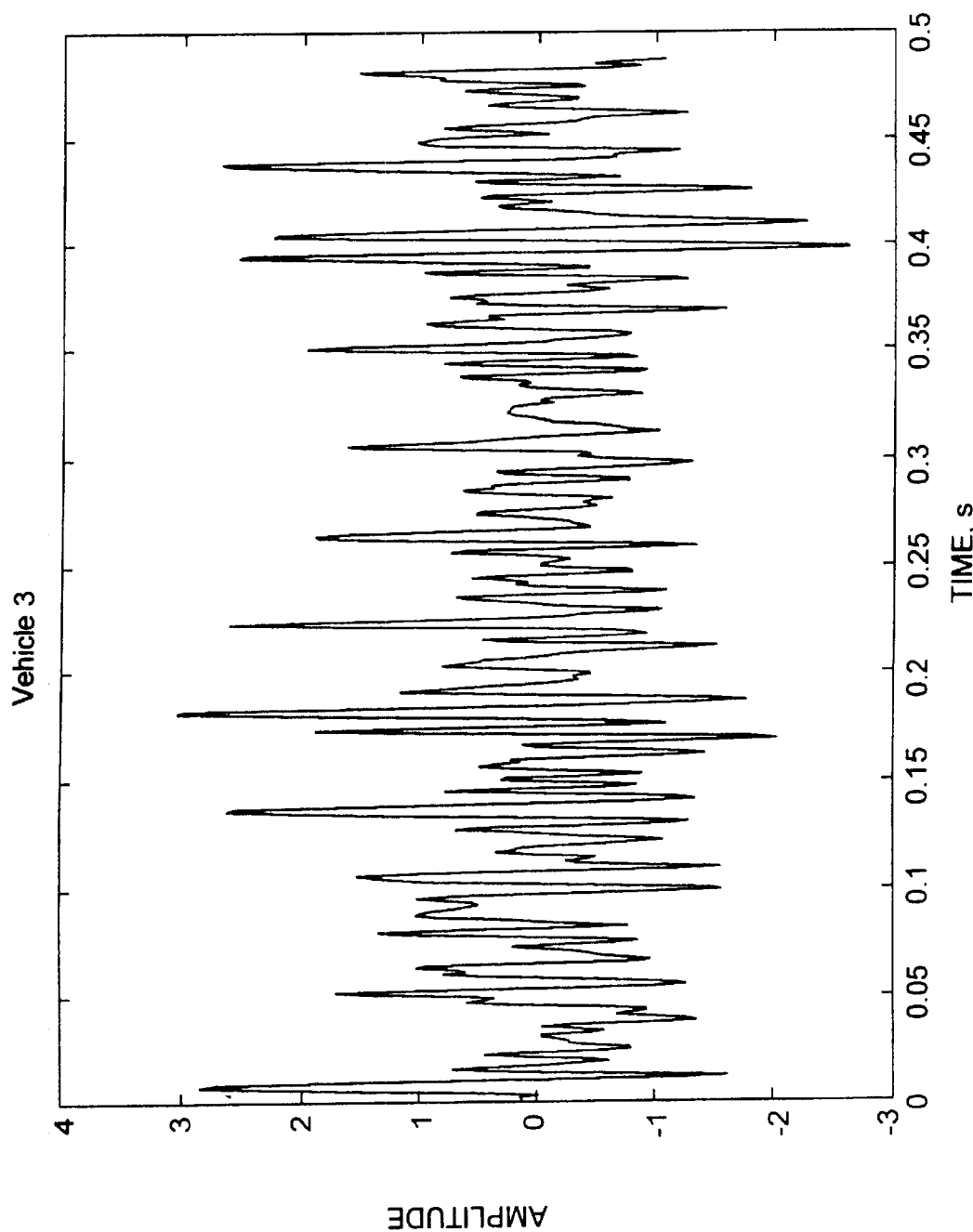
Figure 10D:
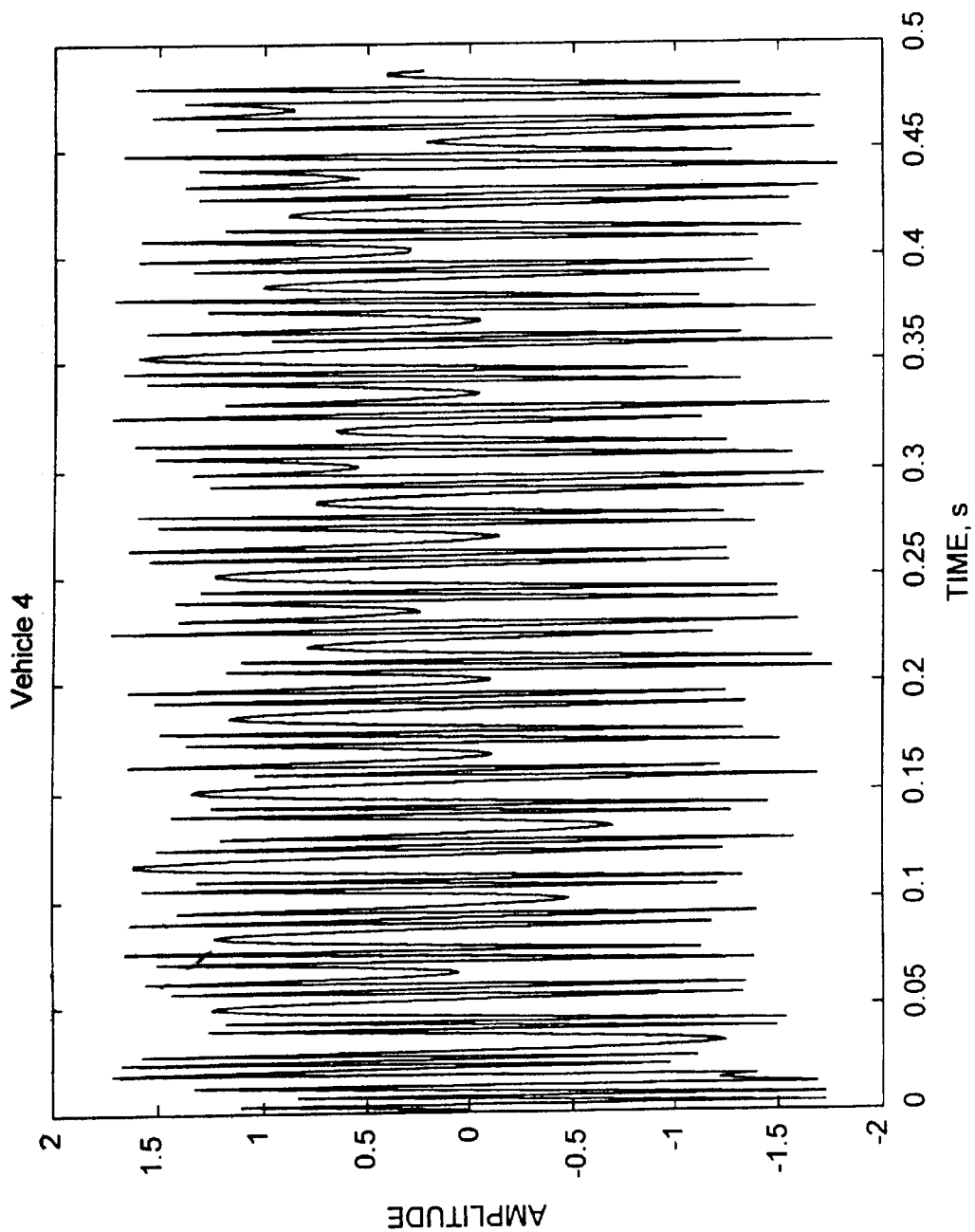
Figure 10E:
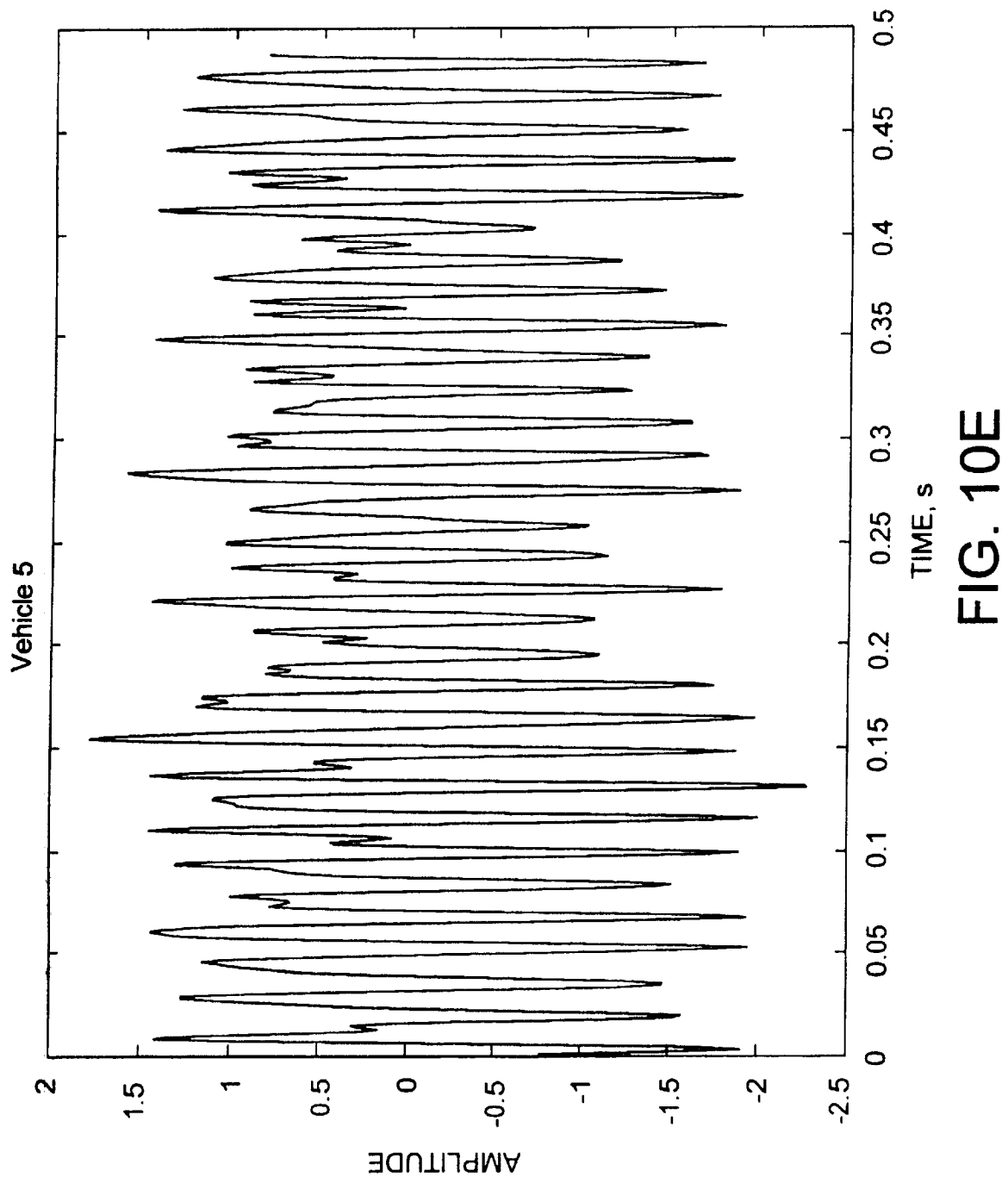
Figure 10F:
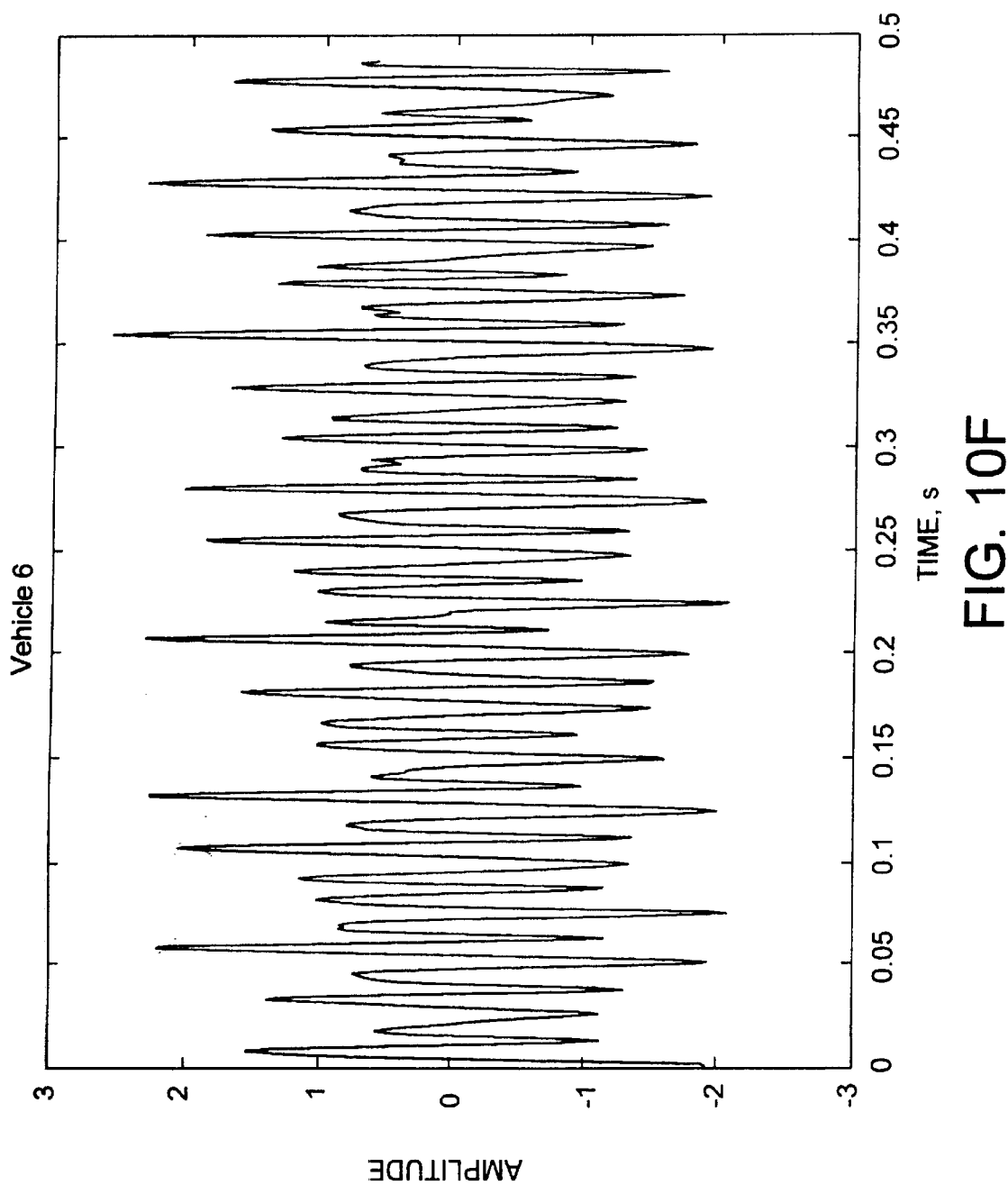
Figure 11A:
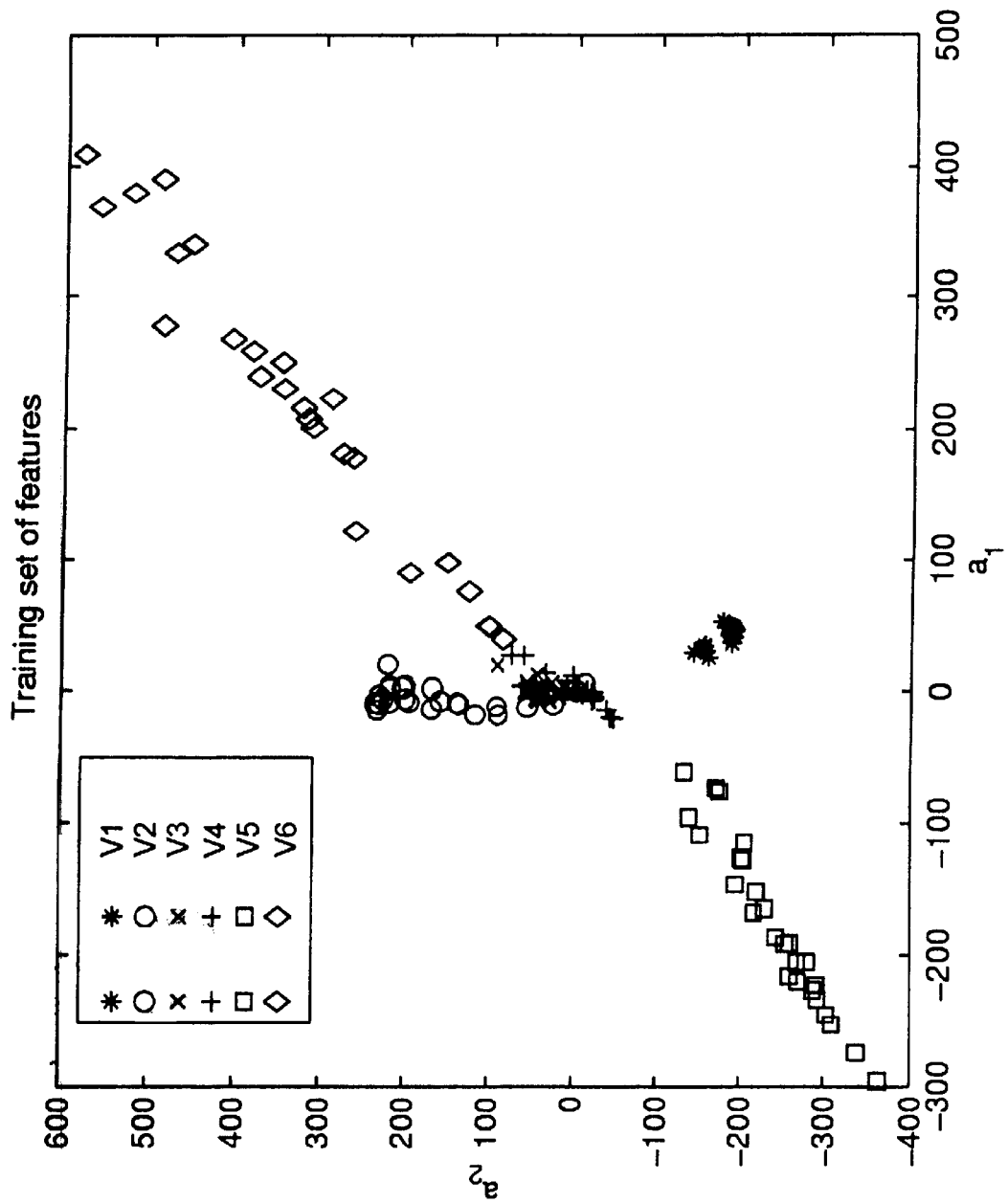
FIGS. 11A–B are graphs of $a_1$ parameter values versus $a_2$ parameters values for training and test data sets, respectively, for the six differing mobile land vehicles of FIGS. 10A–F, according to the present invention.
Figure 11B:
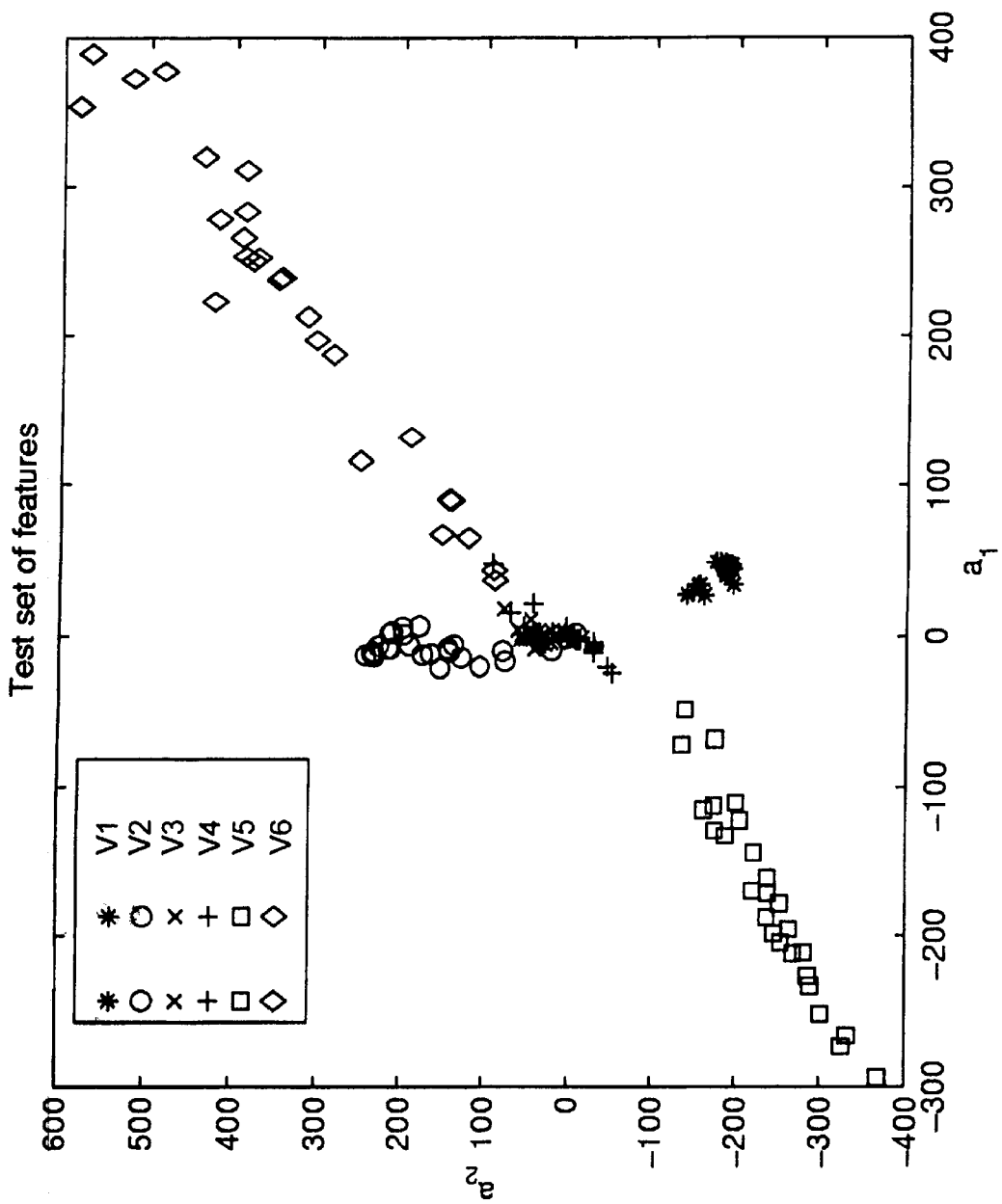

Another embodiment of the invention is shown in FIG. 9, which is similarly based on a digital processing technique, detects deterministic properties of two observed data signals from two sensors. This digital signal processing technique has been shown to be particularly advantageous for vehicle acoustic signature detection. The technique is similarly implemented using the digital signal processor 20 (FIG. 5).

The two observed signals, $x_1(i)$ and $x_2(i)$, are digitized (block 402) and the digital data signals are normalized (block 404). An estimation of moments is performed (block 406), based on the delayed differential equations shown in Appendix A Eqns. 60 and 61, generating an R matrix shown in Appendix A Eqn. 62. The B matrix shown in Appendix B Eqns. 72 and 73 is calculated (block 408) and used with the R matrix to calculate (block 410) the A matrix in accordance with Appendix A, Eqns. 81 and 82. The A matrix is repeated for all data windows $N_w$. The A matrix is provided to a classifier which is implemented through a neural network (block 412).

More particularly, the post-processing decision scheme is provided by a Learning Vector Quantization (LVQ) neural net classifier. The LVQ may be constructed using the NeuralNet toolbox of the Matlab software. Several functions of the neural net toolbox which may be used include: initlvq, trainlvq, and simulvq. In the following description, the standard Matlab syntax is used.

The feature vector output from the above processing chain corresponding to N targets are written as $5 \times N_w$ input matrices A1, A2, . . . AN. The Matlab processing algorithm then consists of the following:

1. The input vector is formed:

P=[A1 A2 . . . AN]

2. The index of targets is formed:

C=[1 1 . . . 1 2 2 . . . 2 . . . N N . . . N . ]

where each index 1, 2, . . . N is repeated Nw times. The index is then transformed into vectors of targets:

T=ind2vec(C)

[S2 Nw]=size(T)

where S2 is the number of known target classes.

3. The size of the competitive neural net hidden layer S1 is chosen. Typically, this is at least several times the number of targets. W1 is a S1×5 weight matrix for competitive layer and W2 is a S2×S1 weight matrix for the linear layer which are obtained during initializing:

S1=5·N

[W1, W2]=initlvq(P, S1, T)

4. Training parameters are then chosen:

df=50 Frequency of progress displays (in epochs)

me=1000 Maximum number of epochs to train lr=0.05 Learning rate

The network is then trained:

TP=[df me lr]

[W1, W2]=trainlvq(W1, W2, P, T, TP)

At this point the neural net is ready to be used for classification. A single 5-dimensional input vector of features A is chosen corresponding to some observed signal, and input to the network, which then makes a decision quantified as the output of the linear output layer:

A=[1;2;3;4;5]

a=simulvq(A, W1, W2)

where the decision is indicated by a neuron, corresponding to the appropriate vehicle class, being activated.

Sample acoustic recordings from 6 mobile land vehicles, shown in FIGS. 10A–10F, respectively, were used to test the classification of the 6 vehicles. All land vehicles are moving left to right at a speed of 15 km/hr. The sampling frequency is 1024 Hz. The model parameters are $L_w=500$, $L_s=100$ (window shift), τ=7 and d=3. 52 features are extracted from around the Closest Point of Approach (CPA) to a recording microphone (not shown). Odd windows were used for training the LVQ neural net, whereas even windows were used to test the classification of the features, shown in FIGS.

11A and 11B. The results are summarized in Table 2 (below) which comprises a "confusion matrix", indicating the correct and incorrect classification decisions output by the neural net, based on the true input classes. The table shows that the neural net classifier provides the correct class decision in most cases.

TABLE 2

|  | Vehicle 1 | Vehicle 2 | Vehicle 3 | Vehicle 4 | Vehicle 5 | Vehicle 6 |
|---|---|---|---|---|---|---|
| Vehicle 1 | 26 | 0 | 0 | 0 | 0 | 0 |
| Vehicle 2 | 0 | 23 | 1 | 2 | 0 | 0 |
| Vehicle 3 | 0 | 3 | 19 | 4 | 0 | 0 |
| Vehicle 4 | 0 | 1 | 5 | 20 | 0 | 0 |
| Vehicle 5 | 0 | 0 | 0 | 0 | 26 | 0 |
| Vehicle 6 | 0 | 1 | 0 | 0 | 0 | 25 |

Figure 12:
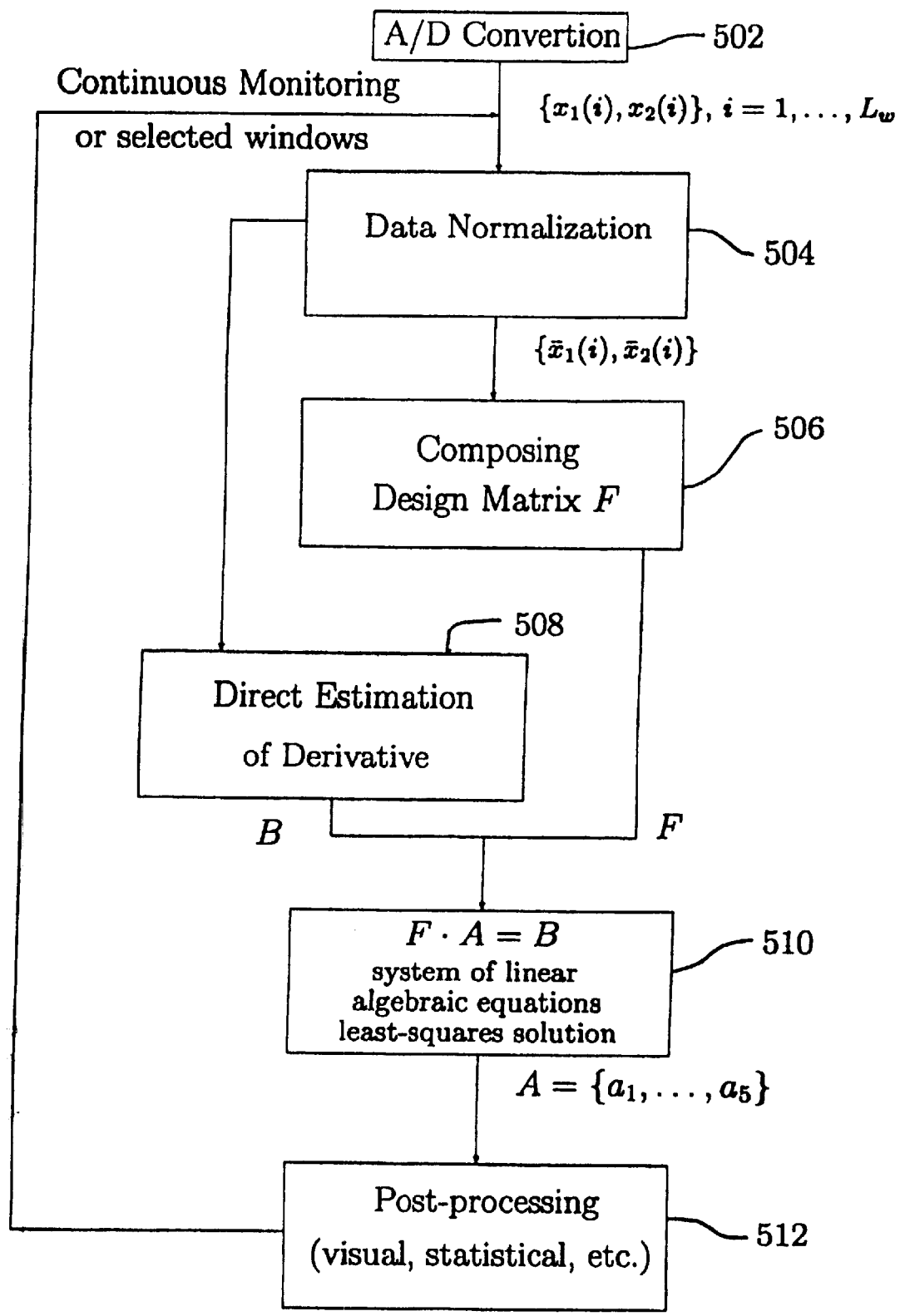
FIG. 12 is a flow chart showing a process for implementing an acoustic signal classifier for detailed characterization of transient (non-stationary) underwater signals, using the digital processor of FIG. 5, according to the invention.

Another embodiment of the invention based on a digital signal processing technique for revealing deterministic properties of observed data signals is shown in FIG. 12. This embodiment is based on the architecture of Section 2.4 of Appendix A and is particularly advantageous for analyzing non-stationary dolphin echo-location signals. The analog location signals are digitized (block 502) by the A/D converter 202 (FIG. 5) and resulting digitized signals are normalized (block 504). A design matrix F is composed (block 506) based on the model specification given in Appendix A Eqn. 9. The derivative matrix B is estimated directly from the normalized data (block 508). Using the design matrix F and the derivative matrix B, the correlation coefficient matrix A is calculated (block 510). Next, the correlation coefficient is used by post-processing steps (block 512) such as those discussed with respect to Appendix A, FIG. A-2, block 106. This process may be applied to monitoring a continuous data stream or applied to selected data windows.

Figure 13:
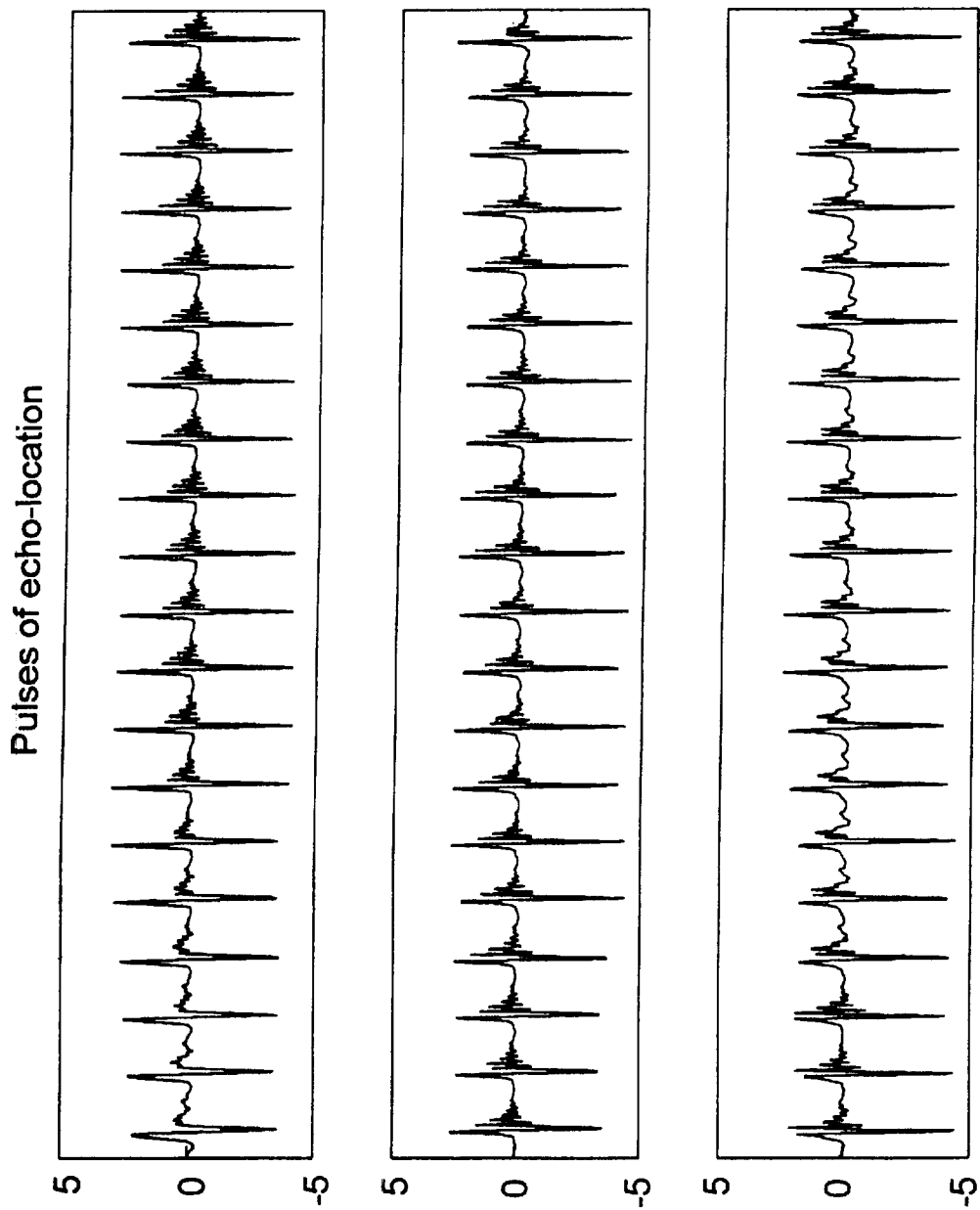
FIG. 13 is a graph of echo-location pulses, versus time, generated by a dolphin.
Figure 14:
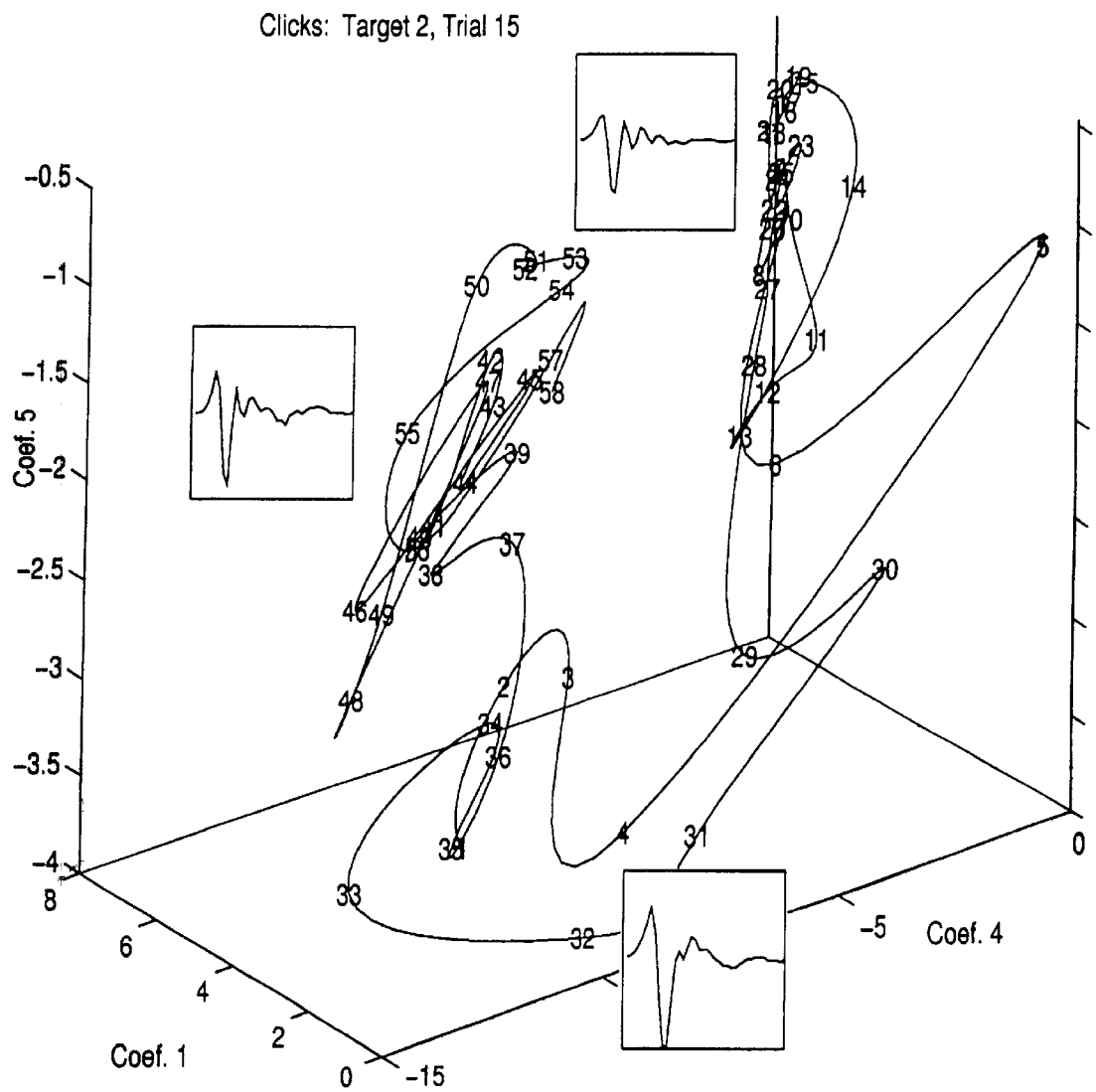
FIG. 14 is a three dimensional graph showing the values of three of the five available estimated model coefficients for the pulses shown in FIG. 13.

The test data consists of a pulse train of short transient acoustic pulses, shown in FIG. 13, produced by dolphins as they attempt to echo-locate objects in an ocean environment. The parameters of the algorithm are τ=1 and $L_w$=50, the pulses are 70–100 ms long, and the sampling frequency is 500 kHz. The results, in the form of a feature trajectory, are shown on an operator's display and are illustrated by FIG. 14. A systematic search strategy during the first few dolphin pulses is evident.

Figure 15:
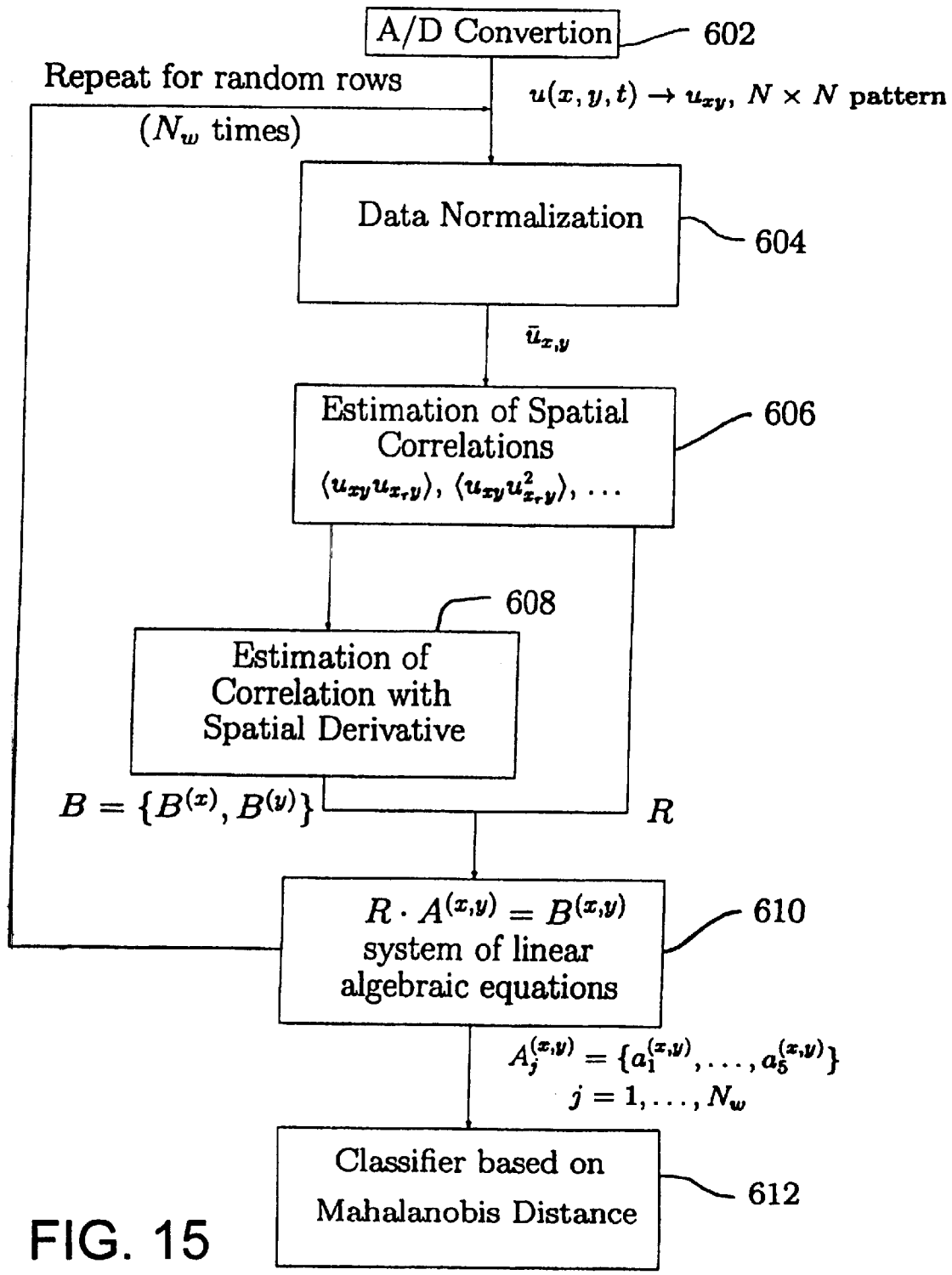
FIG. 15 is a flow chart showing a process for implementing a spatial pattern or image recognition system based on dynamical generator models, using the digital processor of FIG. 5, according to the invention.

Another embodiment of the invention based on a digital signal processing technique for revealing deterministic properties of observed data signals is shown in FIG. 15. This embodiment is based on the architecture of Section 2.5 of Appendix A and is particularly advantageous for analyzing spatial patterns. The image data signals are digitized (block 602) by the A/D converter 202 (FIG. 5) and resulting digitized signals are normalized (block 604). Rows of data extracted from the image matrix are used as input. A spatial correlation matrix R is composed (block 606) based on the model specification given in Appendix A Eqns. 86 and 87. A spatial derivative matrix B is estimated directly from the normalized data (block 608). Using the correlation matrix R and the derivative matrix B, the correlation coefficient matrix A is calculated (block 610). Next, the correlation coefficient is used by a post processing step (block 612) such as a classifier based on a Mahalanobis Distance.

The test data is constructed using the following Matlab commands:
1. Domain definition:
   pderect([−1 1 1 −1], 0R10)
   set (findobj(get(pde__fig,'Children')
   Tag',PDEEval'),'String','R1'))
2. Boundary conditions:
   pdetool('changemode', 0)
   pdesetbd 4, 'neu',1,'0','0')
   pdesetbd (3,'neu',1,'0','0')
   pdesetbd (2,'neu',1,'0','0')
   pdesetbd (1,'neu', 1,'0','0')
3. Mesh generation:
   setuprop(pde__fig,'Hgrad',1.3)
   setuprop(pde__fig,'refinemethod','regular')
   pdetool('initmesh')
   pdetool('refine')
   pdetool('refine')
4. Definition of the partial differential equation:
   pdeseteq (3,'1.0','0.0','0.0','1.0','0:5', . . .
   'sin(4*pi*(x+2*y))+sin(8*pi*(x−2*y))', . . .
   'cos(4*pi*(x+2*y))+cos(8*pi*(x−2*y))','[0 100]')
   setuprop(pde__fig,'currparam',['1.0';'0.0';'0.0';'1.0'])
5. Set parameters:
   setuprop(pde__fig,'solveparam', . . .
   str2mat('0','8208','10','pdeadworst', . . .
   '0.5','longest','0','1E−4','','fixed','Inf'))
6. Solve the equation:
   pdetool('solve')

The solution has been converted from a triangularized grid to a uniform rectangular grid with the following commands:
   x=−1:2/64:1
   y=−1:2/64:1
   uxy=tri2grid(p,t,u,x,y)

To increase the sampling rate, the image has been extrapolated to a higher resolution grid using a cubic interpolation routine with the following commands:
   [xi, yi]=meshgrid(−1:2=512:1, −1:2=512:1)
   uxyi=interp2(x, y, uxy, xi, yi, 'cubic')

Figure 16A:
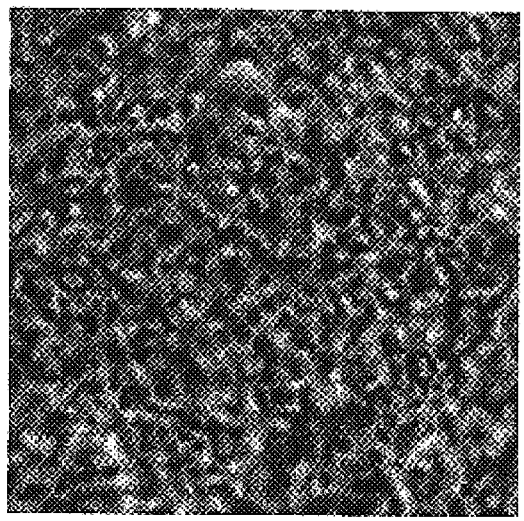
FIG. 16A is a plot of a random field of image data.
Figure 16B:
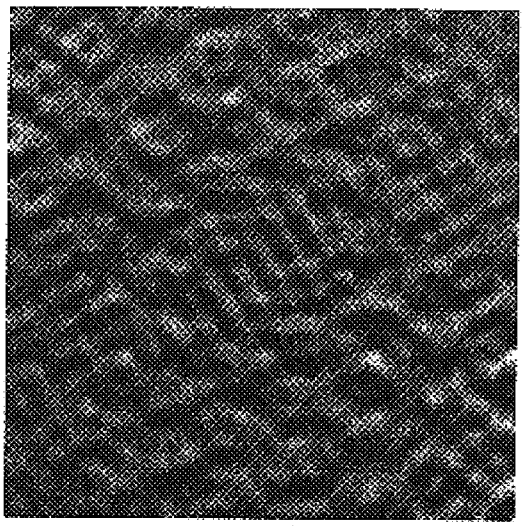
FIG. 16B is a plot of image data generated by numerically solving a set of wave equations.

A graphical plot showing the 2D image produced by these commands is shown in FIG. 16B. In order to test the discrimination capability of the algorithm, it is also necessary to construct a data set consisting of a purely random field. The random field is generated with the following Matlab commands:
   un=randn(size (u))
   unxy=tri2grid(p, t, un, x, y)
   unxyi=interp2(x, y, unxy, xi, yi, 'cubic') This random field has similar spectral properties as that of the uncorrupted image. The random field image is shown in FIG. 16A.

Figure 16C:
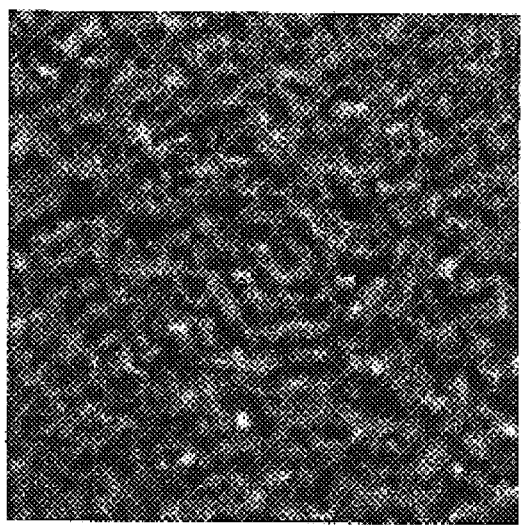
FIG. 16C is the image data of FIG. 16B corrupted by 100% noise shown in the plot of FIG. 16A.

To make the simulation more realistic, a random field component is added to the pure wave equation solution, representing possible measurement errors. The resulting (final) input data is shown in FIG. 16C, where a random component has been added with 100% of the variance of the pure wave component.

To analyze these data sets, a model is required which incorporates spatial information from the images. In its most general setting, the model defined by Appendix A Eqn. 11 may be utilized. Here, since the single images have no time dependency, a much simpler but cruder model form may be utilized. The algorithmic device has as its data model the DDE of Appendix A, Eqn. 9. The independent variables are assumed to all be spatial as indicated in Appendix A Eqns. 88 and 89.

The algorithmic device is intended to sense local structure in the continuous field constituting the image. Hence, to avoid possible biases due to boundary conditions and spurious symmetries in the data, we construct a set of data (observation) window constructed by choosing a random set of rows (or columns) of the image.

Using this set of input data, the model coefficients of Appendix A Eqn. 86 are estimated using the correlation method described in Section 1.1. The independent variable is the x-index of the image. Otherwise, the algorithmic operations are identical to the procedure of Section 1.1 in which the independent variable is time.

For the example of FIG. 16A, the input data consists of a 513×513 pixel image, and 100 observation windows are chosen using random rows to generate a data ensemble. The data derivative is approximated using a d=5, while τ=15. After processing, the algorithm outputs an ensemble of 5 dimensional feature vectors corresponding to Block 105 of FIG. A-2. Two such distributions of feature vectors are obtained, corresponding, respectively, to the purely random and noisy wave equation data. The ($a_1$, $a_2$) projection of these two ensembles is plotted in FIG. 16D. In this case, the local dynamical structure of the noisy wave equation is sensed, and is apparent by the separation of the two feature distributions.

Figure 16D:
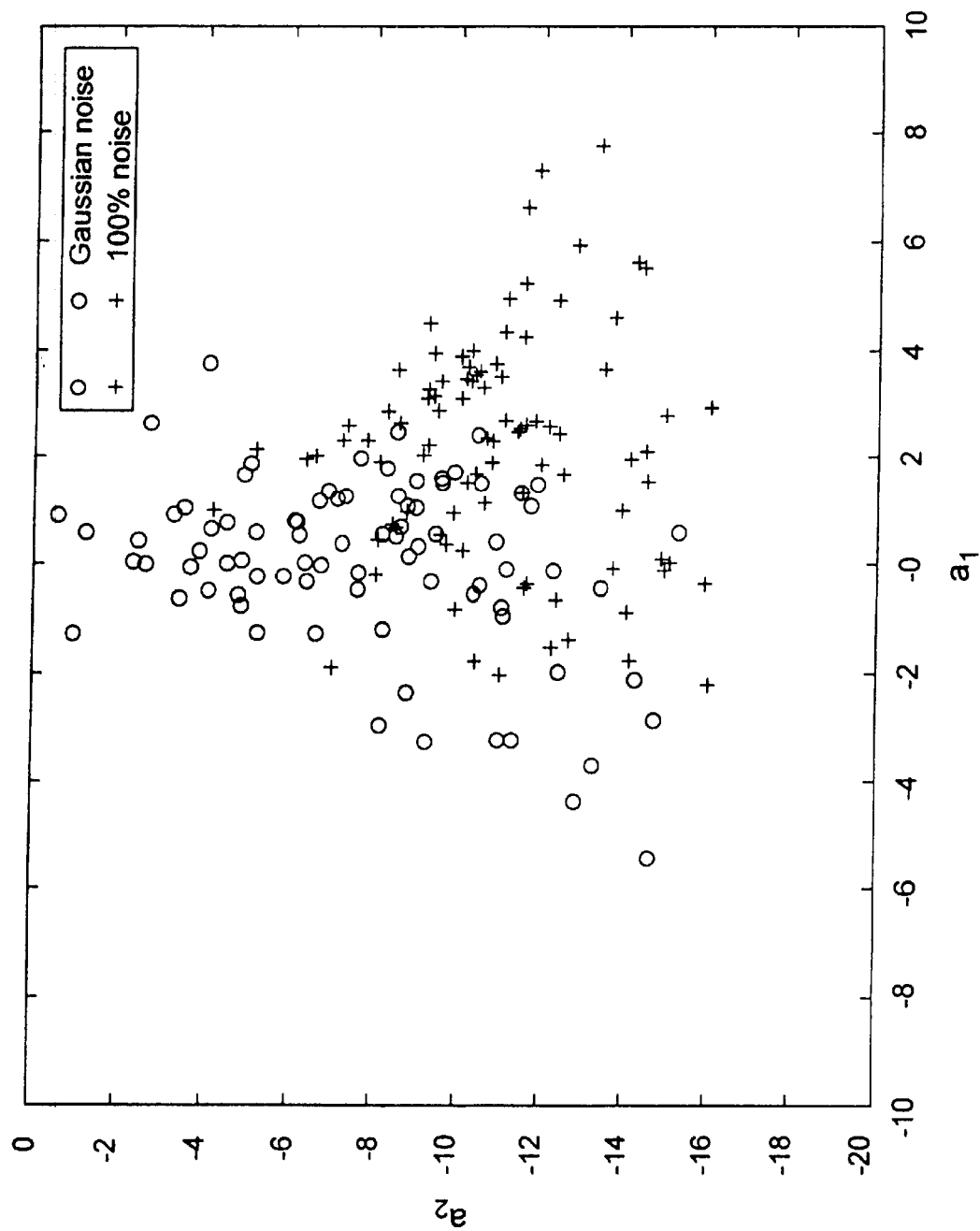
FIG. 16D is a graph of a, parameter values verses $a_2$ parameters values for the corrupted image of FIG. 16A, indicated by the symbol (○), and the random image data of FIG. 16C, indicated by the symbol (+).

The means and standard deviations for the feature distributions shown in FIG. 16D are shown in Table 3 below.

TABLE 3

|  | $a_1$ | $a_2$ |
|---|---|---|
| 100% moise Mean | 1.73 +/− 0.23 | −11.42 +/− 0.26 |
| σ | 2.25 | 2.64 |
| pure noise Mean | 0.08 +/− 0.19 | −8.34 +/− 0.47 |
| σ | 1.86 | 4.72 |

To estimate the statistical significance of the discrimination of the two feature distributions, a statistical measure is implemented based on the Mahalanobis distance [Ray, S.; Turner, L. F. "Mahalanobis Distance-Based Two New Feature Evaluation Criteria", Information Sciences 60, p.217 (1992)], which yields a confidence interval for discrimination. Using the Mahalanobis measure, it can be estimated that the two distributions shown in the bottom right of FIG. 16D are distinct to a 0.9999 confidence level. Hence, the two input data sets are structurally distinct to a high level of statistical confidence. Table 4 below summarizes the discrimination level of the device for the analysis of 200% and 300% noisy data sets (not shown):

TABLE 4

| noise level | 100% | 200% | 300% |
|---|---|---|---|
| confidence level | 0.999 | 0.938 | 0.811 |

General Theoretical Development Implemented by the System for Signal and Pattern Detection and Classification by Estimation of Continuous Dynamical Models 1. General Theoretical Development of the Invention
1.1 Fitting Dynamical Models to Data The task of fitting various dynamical models to a data stream has been partly considered a system identification problem (Abed-Meraim, K., Qiu, W., Hua, Y. "Blind System Identification". Proceedings of the IEEE 85(8), p. 1310 (1997)). A finite dimensional dynamical model can be described by a system of:

Ordinary Differential Equations (ODEs):

$$\dot{x}=F_A(x,t), \quad (1)$$

Partial Differential Equations (PDEs):

$$\frac{\partial U(x,t)}{\partial t} = F_A\left[U(x,t), \frac{\partial U(x,t)}{\partial x}, \dots, t\right], \quad (2)$$

or through even more general integro-differential forms:

$$\dot{x}=\hat{G}_A[x,t'], \quad (3)$$

where $\hat{G}$ denotes an integro-differential operator.

The input of the system is a data stream (temporal, spatial, or spatio-temporal) $x \equiv \{x_1, x_2, \dots\}$, which can be either scalar or multivariate. The set of model parameters $\{A\}$ is usually estimated using an optimization technique, which minimizes a cost function, which can be defined as:

$$Q=\|\dot{x}-F_A(x,t')\|, \quad (4)$$

where $\|\cdot\|$, for example, can be an $L_2$ norm. In the latter case, the technique is called a least-squares minimization.

Our implementation of dynamical modeling schemes has several important differences from existing schemes. Advantageous features of our approach can be summarized as follows.

We use dynamical models generically represented by Delayed Differential Equations (DDEs) or by a system of coupled DDEs, which can be obtained from Eq. (3) as a special case:

$$\dot{x}=F_A(x,x_{\tau_1},\dots,x_{\tau_m},t) \quad (5)$$

where $x_\tau \equiv x(t-\tau)$, and A indicates a vector of parameters to be estimated. Note that Eq. (1) is a subclass of Eq. (5) when all delays are zero. However, the much wider solution family of DDEs allows us to describe a great variety of signals, which cannot be represented by finite-dimensional ODEs.

We use very general functional expansions of $F_A(\cdot)$ to fit the model Eq. (5) to a process x(t).

We derived a simple and very efficient estimation technique for the parameters A using a generalized set of higher-order cumulants (nonlinear correlations) and their derivatives.

We utilize the estimated parameters A as classification features to discriminate between signals of different origin, such as detecting deterministic signals embedded in noise, or related signal processing tasks.

The processing method is not restricted to any particular signal class or generator.

1.2 Estimation of DDE Models.

Here we address the practical problem of estimating the unknown coefficients of a given dynamical model such as Eq. (5) directly from a measured signal x(t).

Figure 17:
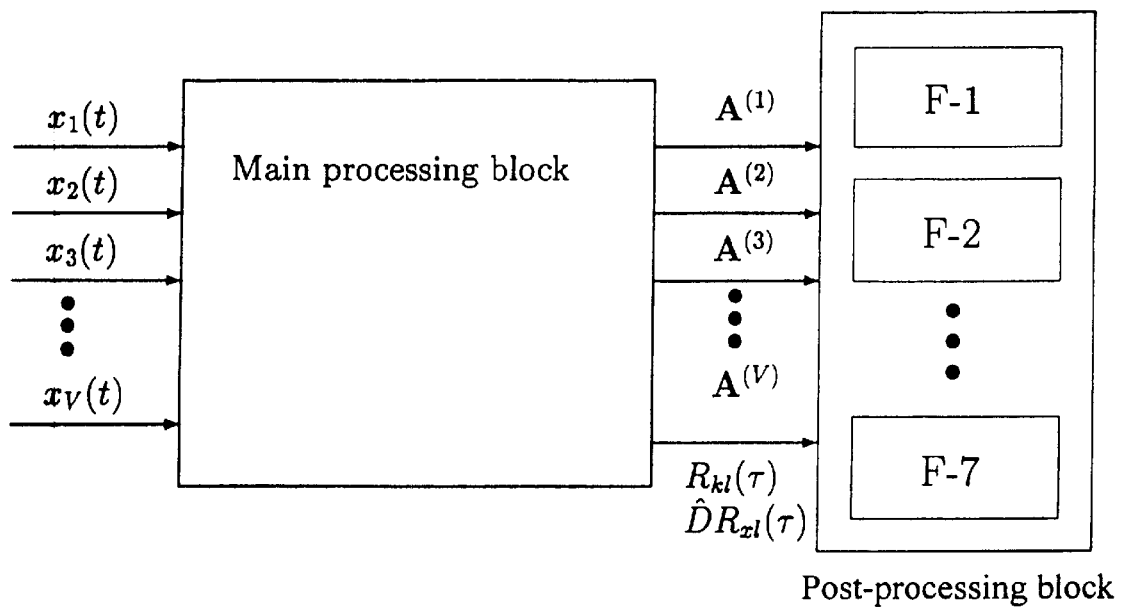
FIG. 17 is a flow diagram of general signal processing techniques showing correlations for coefficient estimation and showing post-processing according to the present invention.
Figure 18:
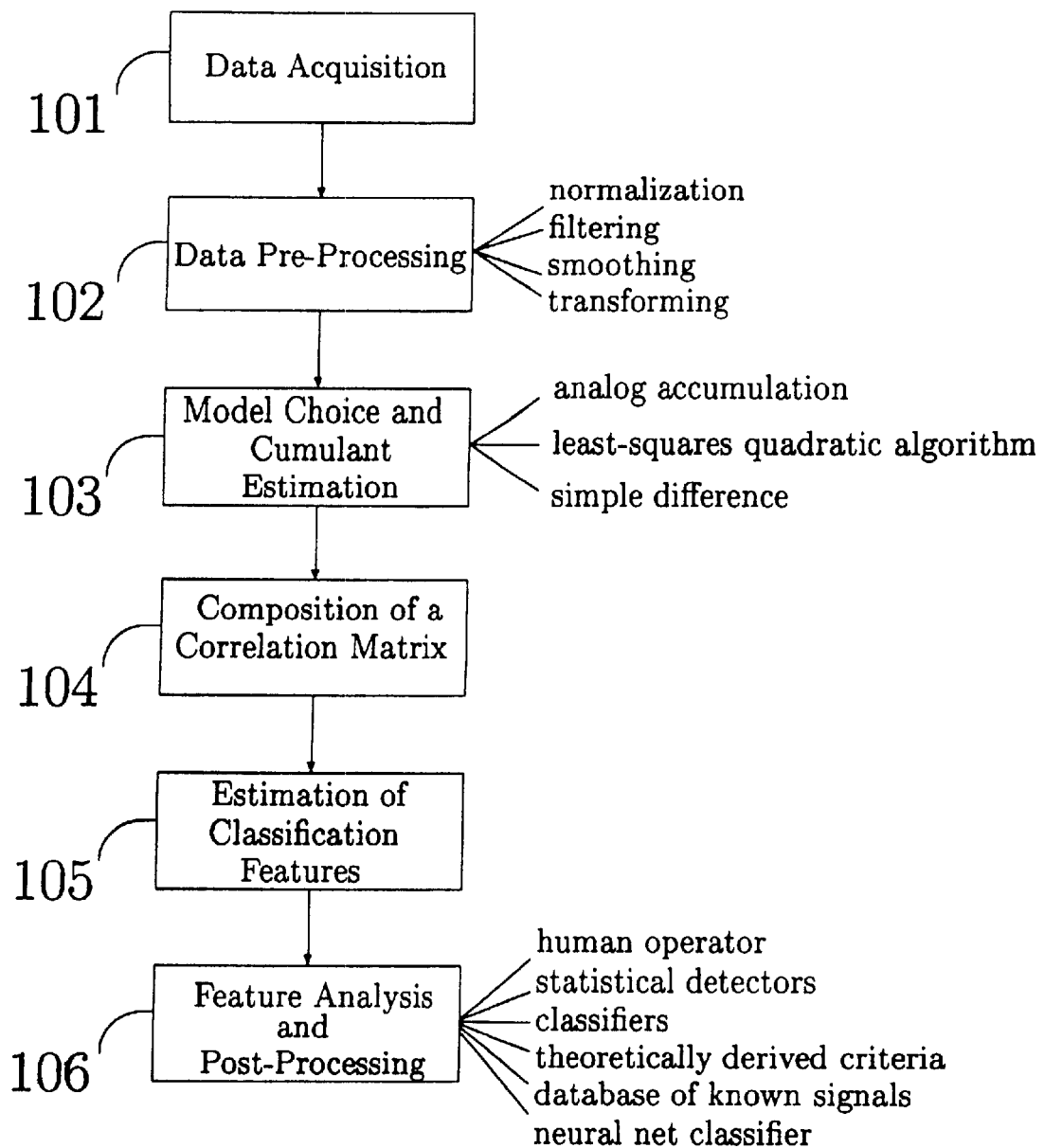
FIG. 18 is a block diagram showing the general signal processing scheme, according to the invention, for revealing deterministic properties of observed data signals.

Though the general processing scheme as shown in FIG. 17 and FIG. 18 specifies the principal processing chain, we must stress here that several components can be implemented in a variety of ways using software and hardware-based devices which are specifically designed for a particular application. Input signal $x=\{x_1, x_2, \dots, x_V\}$ is transformed into coefficients of dynamical model $A^{(1)}=\{a^{(1)}\}$, $A^{(2)}=\{a^{(2)}\}, \dots, A^{(V)}=\{a^{(V)}\}$ in the Main Processing Block.

Also output are correlations $\{R_{kl}^{(j)}, \hat{D}R_{kl}^{(j)} | j=1, \ldots, V\}$ used to estimate coefficients. All these outputs can be post-processed using F-1, F-2, ..., F-7 techniques described in the text. The following are examples of implementations for each corresponding component in the processing scheme:

Data acquisition (FIG. 18, block 101). Can be performed by means of

A-1 continuously measured data x(t), or data digitized while recording from single or multiple sensors, including acoustic, optical, electromagnetic, or seismic sensors, but not restricted to this set; the process of digitizing transforms an independent continuous variable into its discrete version: $t \to t_i = t_0 + (i-1)\Delta t$, where $\Delta t$ is the sampling interval, which defines a time scale for the incoming data;

A-2 data retrieved from a storage device such as optical or magnetic disks, tapes and other types of permanent or reusable memories;

A-3 data generated and/or piped by another algorithm, code, driver, controller, signal processing board and so on;

In the step of data acquisition we assume that a stream of analog data, or a set of digitized scalar or vector data is obtained and this data set may contain information to be detected, classified, recognized, modeled, or to be used as a learning set. The data consists of, or is transformed to, a set of ordered V -dimensional vectors $x(i)=\{x_1(i), x_2(i), \ldots, x_V(i)\}$. This becomes a set of ordered numbers in case of scalar input $x(i) \equiv x(i)$, where the index $i=1, 2, \ldots, L$ can indicate time, position in space, or any other independent variable along which data evolution occurs. We will also refer to x(i) as an "observation" or "measurement" window. In continuous form (where necessary) we will denote the signal as a continuous (analog) function x(t) of independent variable t, $t \in [T_1 T_2]$.

Data preprocessing (FIG. 18, block 102). Can be performed by means of

B-1 normalizing the data;
B-2 filtering the data;
B-3 smoothing the data;
B-4 transforming the data.

It is convenient, but not necessary, to organize the data in a $D \times L_{eff} \times V$ data matrix X, where the rows are delayed observations, with the independent variable indexed from 1 to $L_{eff} = L - \max\{\tau_j | j=1, \ldots, (D-1)\}$:

$$X = \begin{pmatrix} x(1+\tau_{D-1}) & x(1+\tau_{D-2}) & \ldots & x(1) \\ x(2+\tau_{D-1}) & x(2+\tau_{D-2}) & \ldots & x(2) \\ \ldots & \ldots & \ldots & \ldots \\ x(L_{eff}+\tau_{D-1}) & x(L_{eff}+\tau_{D-2}) & \ldots & x(L_{eff}) \end{pmatrix}. \quad (6)$$

In general, we may use several delays and the delay $\tau \to \{\tau_j | j=1, \ldots, (D-1)\}$ is a vector. However, for simplicity we will mostly use a single delay from now on. If the input data is a scalar, then X is a 2-dimensional $D \times L_{eff}$ matrix:

$$X = \begin{pmatrix} x(1+\tau_{D-1}) & x(1+\tau_{D-2}) & \ldots & x(1) \\ x(2+\tau_{D-1}) & x(2+\tau_{D-2}) & \ldots & x(2) \\ \ldots & \ldots & \ldots & \ldots \\ x(L_{eff}+\tau_{D-1}) & x(L_{eff}+\tau_{D-2}) & \ldots & x(L_{eff}) \end{pmatrix}. \quad (7)$$

In a semi-automated or fully automated mode of operation, at this step we can choose parameters $\tau_j$ and D numerically. If the origin of the signal or performance improvement goals do not dictate a particular preference, these default values can be used: D=2 (single delay) and $\tau$ corresponds to a first minimum or a first zero (whichever is less) of the autocorrelation function of the signal.

Model Choice and Cumulant Estimation (FIG. 18, block 101).

A primary difference between our system and existing devices based on regression schemes or linear modeling techniques (ARMA models), is that we determine a relationship between the data and its rate of evolution expressed by the signal derivative. This provides us with an explicit dynamical modeling framework. Furthermore, we define a method for the estimation of the model coefficients based on generalized correlation functions, rather than explicit cost function minimization. Finally, we further postulate that robust results can be obtained even for scalar signals generated by a multi-dimensional system, or for signals which were nonlinearly transformed on their way from the generator to the detector, based on theorems underlying the field of nonlinear dynamics.

At this point we need to specify the exact model type by defining a functional form F in the right-hand-side of Eq. (5). If the signal class is unknown a priori, we choose to write F as a linear expansion in parameters A. By changing expansions one can control the type of model for data analysis. There is an infinite number of ways a particular expansion can be composed, but there are only a few general types:

C-1 Simple polynomial expansion (Taylor expansion). This is the most general local representation of the signal derivative though it is not necessarily valid globally. We recommend it as a model for unknown input signals or in cases when many signals of different origin are processed.

C-2 Rational polynomial expansion, being a ratio of two polynomial expansions similar to C-1, but more general in their ability to represent signals.

C-3 Expansion using a set of specific standard orthogonal functions. This can be used if there is reason to believe that the signals-of-interest may have a certain state space topology or dynamical properties.

C-4 Expansion in a set of empirical orthogonal functions obtained from a data matrix by orthogonalization (for example, using a singular value decomposition, or a Gram-Schmidt procedure). This expansion has features unique to a particular observed set of signals.

C-5 Any of the above mentioned expansions, which additionally include terms explicitly containing the independent variables (for example, time or a coordinate). This type of expansion can be used to process non-stationary signals.

For any given processing chain the same expansion should be used to compare all outputs. For simplicity, in the following description we will refer to Expansion C-1 except where indicated. Let the signal be a scalar input and X be a set of delayed variables formed from the input:

$X(i) \equiv \{x(i), x(i-\tau_1), \ldots, x(i-\tau_{D-1})\}$; or in the analog/continuous domain:

$X(t) \equiv \{x(t), x(t-\tau_1), \ldots, x(t-\tau_{D-1})\}$. Correspondingly, we assume that $\tau$ is an integer number in the digital domain and is a real number in the continuous domain. Then the expansion with (M+1) linear parameters A can be written as:

$$F_{A(j)}^{(j)}[X] = \sum_{k=0}^{M} a_k^{(j)} \phi_k^{(j)}(X), \quad j = 1, \ldots, V \quad (8)$$

where $\{\phi_k^{(j)}(X)\}$ is a set of scalar basis functions for the j-th component of F. In the general polynomial case C-1 for a scalar input, $\phi_k[x(t)]=x(t)^l x(t-\tau)^m \ldots x(t-(D-1)\tau)$, where $0 \leq l, m,; q \leq P$ and $m+l+ \ldots +q \leq P$; the expansion is characterized by an order P and (D−1) delayed variables, and thus has $N=(D+P)!/(D!P!)$ terms. For example, we can specify Eq. (8) using continuous notation as a second order (P=2) expansion with a single delay (D=2) and scalar input $X(t) = \{x(t), x(t-\tau)\}$, which is (omitting $a_0$ for simplicity):

$$\dot{x} = F[x, x_\tau] + a_1 x + a_2 x_\tau + a_3 x^2 + a_4 x x_\tau + a_5 x_\tau^2 \quad (9)$$

In the case of D=1 and a 2-component vector input, $X(t) = \{x_1(t), x_2(t)\}$, the model is reduced to a set of two coupled ODEs. For P=2 it yields a quadratic expansion with 10 parameters:

$$\dot{x}_1 F^{(1)}[x_1, x_2] a_1^{(1)} x_1 + a_2^{(1)} x_2 + a_3^{(1)} x_1^2 + a_4^{(1)} x_1 x_2 + a_5^{(1)} x_2^2 \quad (1)$$
$$(10)$$
$$\dot{x}_2 = F^{(2)}[x_1, x_2] = a_1^{(2)} x_1 + a_2^{(2)} x_2 + a_3^{(2)} x_1^2 + a_4^{(2)} x_1 x_2 + a_5^{(2)} x_2^2. \quad (2)$$

We can also construct spatio-temporal models corresponding to evolutions described by Eq. (2). We assume that the data in this expansion is represented by a 2D matrix evolving in time: $X(t) = \{x_{ij}(t) | i=1 \ldots L_1, j=1 \ldots L_2\}$. The geometry of the 2D image under consideration is not necessarily Euclidean, thus "1" and "2" are not necessarily "x" and "y", but can be "distance" and "angle" in polar coordinates, for example $$\dot{x} = F(X) = a_0 + a_1 x_{i,j}(t) + a_2 x_{i,j}(t-\tau) + a_3 x_{i-1,j}(t) + a_4 x_{i-1,j}(t-\tau) +$$
$$+ a_5 x_{i+1,j}(t) + a_6 x_{i+1,j}(t-\tau) + a_7 x_{i,j-1}(t) + a_8 x_{i,j-1}(t-\tau) +$$
$$+ a_9 x_{i,j+1}(t) + a_{10} x_{i,j+1}(t-\tau) + a_{11} x_{i,j}^2(t) + a_{12} x_{i,j}(t) x_{i,j}(t-\tau) + \ldots \quad (11)$$

This is a much longer expansion than the simple polynomial one for scalar signals. For P=2 and a single delay it includes 28 monomials. Also, note that such expansion takes into account spatial derivatives up to the second order only. For the model defined by Eq. (9) the problem is reduced to estimating 5 coefficients $A = \{a_1, \ldots, a_5\}$ using the signal $\{x(i) | i=1, \ldots, L\}$ as input. Coefficients can be estimated in a data window by forming a cost function and minimizing the model error, Eq. (4), using e.g. a least-squares technique. Alternately, we may use a coefficient estimation scheme based on computing correlation functions. For each component of the input we define a generalized set of correlations as $$R_{kl}(\tau) \equiv \frac{1}{n} \sum_{i=1}^{n} \phi_k(X) \phi_l(X), \quad n = L_{eff} \; k, l = 0, \ldots, M \quad (12)$$

$$\hat{D} R_{xl}(\tau) \equiv R_{\hat{D}l}(\tau) \equiv \hat{D} \frac{1}{n} \sum_{i=1}^{n} x_j \phi_l(X) = \frac{1}{n} \sum_{i=1}^{n} \dot{x} \phi_l(X), \quad n = L_{eff} \quad (13)$$

where $\hat{D}$ is a derivative operator explained below; subscripts k and l denote correlation between k-th and l-th basic terms in expansion of Eq. (8) and subscript $\hat{D}$ indicates a correlation with the signal derivative. There are V such sets to be defined for a V-dimensional vector input x. The calculation of the model coefficients A is performed using sums and products of these correlation functions, and is explained in the description of the next two blocks. Note that the correlation with the derivative (Eq. (13)) can be replaced by the derivative of the correlation:

$$\dot{R}_{xx}(\tau) = \frac{d}{d\tau} R_{xx}(\tau). \quad (14)$$

This allows one to use both techniques: direct estimation of the signal's derivative or estimation of correlation first, and then taking its derivative with respect to delay time τ. There is an advantage in estimating derivatives from correlation functions as opposed to direct estimation from the signal. Such a procedure estimating derivatives from correlation function takes advantage of the natural smoothing properties of the correlations, as well as often being far faster numerically. For the model Eq. (9) the set of necessary correlations is specified in Table 5.

Table 5. Definitions of various correlations to be used to calculate coefficients for the model. Typically, the signal is normalized to zero mean, i.e. $\langle x \rangle = 0$ (which would be $m_1$ in the standard notation of Table 5), as such a simplification brings the correlation functions into compliance with the conventional definitions. The derivative operator $\hat{D}$ in a digital domain is defined by Eq. (15) or Eq. (16–17).

| No. | Definition | Notation | Shorthand | Digital Alorithm |
|---|---|---|---|---|
| 1 | $\frac{1}{T}\int_0^T x x_\tau \, dt$ | $R_{xx}(\tau)$ | $r_1$ | $\frac{1}{n}\sum_{i=1}^{n} x(i+\tau)x(i), \; n = L - \tau$ |
| 2 | $\frac{1}{T}\int_0^T \dot{x} x_\tau \, dt$ | $\dot{R}_{xx}(\tau)$ | $d_1$ | $\hat{D}\frac{1}{n}\sum_{i=1}^{n} x(i+\tau)x(i), \; n = L - \tau$ |
| 3 | $\frac{1}{T}\int_0^T x^2 \, dt$ | $\langle x^2 \rangle$ | $m_2$ | $\frac{1}{n}\sum_{i=1}^{n} x^2(i), \; n = L$ |
| 4 | $\frac{1}{T}\int_0^T x^3 \, dt$ | $\langle x^3 \rangle$ | $m_3$ | $\frac{1}{n}\sum_{i=1}^{n} x^3(i), \; n = L$ |

-continued

| No. | Definition | Notation | Shorthand | Digital Alorithm |
|---|---|---|---|---|
| 5 | $\frac{1}{T}\int_0^T x^4 dt$ | $<x^4>$ | $m_4$ | $\frac{1}{n}\sum_{i=1}^n x^4(i), n = L$ |
| 6 | $\frac{1}{T}\int_0^T x^2 x_\tau dt$ | $R_{x^2x}(\tau)$ | $r_2$ | $\frac{1}{n}\sum_{i=1}^n x^2(i+\tau)x(i), n = L - \tau$ |
| 7 | $\frac{1}{T}\int_0^T xx_\tau^2 dt$ | $R_{xx^2}(\tau)$ | $r_3$ | $\frac{1}{n}\sum_{i=1}^n x(i+\tau)x^2(i), n = L - \tau$ |
| 8 | $\frac{1}{T}\int_0^T x^2 x_\tau^2 dt$ | $R_{x^2x^2}(\tau)$ | $r_4$ | $\frac{1}{n}\sum_{i=1}^n x^2(i+\tau)x^2(i), n = L - \tau$ |
| 9 | $\frac{1}{T}\int_0^T \dot{x}xx_\tau dt$ | $<\dot{x}xx_\tau>$ | $d_2$ | $d_2 = 0.5\, \hat{D}r_2$ |
| 10 | $\frac{1}{T}\int_0^T \dot{x}x_\tau^2 dt$ | $R_{xx}^2$ | $d_3$ | $\hat{D}\frac{1}{n}\sum_{i=1}^n x(i+\tau)x^2(i), n = L - \tau$ |
| 11 | $\frac{1}{T}\int_0^T x^3 x_\tau dt$ | $R_{x^3x}(\tau)$ | $r_5$ | $\frac{1}{n}\sum_{i=1}^n x(i+\tau)^3 x(i), n = L - \tau$ |
| 12 | $\frac{1}{T}\int_0^T xx_\tau^3 dt$ | $R_{xx^3}(\tau)$ | $r_6$ | $\frac{1}{n}\sum_{i=1}^n x(i+\tau)x^3(i), n = L - \tau$ |

Note that estimating the dynamical model requires explicit or implicit estimation of the signal derivative. This may be performed directly in the analog domain. Alternately, here are several algorithms which can be optionally used to estimate continuous derivatives in a digital domain d/dt→$\hat{D}$:

D-1 least-squares quadratic algorithm with smoothing:

$$\hat{D}R(\tau) = \frac{3}{d(d+1)(2d+1)\Delta t} \sum_{j=\tau-d}^{j=\tau+d} R(\tau+j) \cdot j, \quad (15)$$

where (2d+1) is the number of points taken for the estimation, $\Delta t$ is the time (or length, if the derivative is spatial) between samples;

D-2 higher-order estimators (for example, cubic algorithms) and algorithms minimizing products different from quadratic (for example, a sum of absolute values of differences between the derivative and its estimate) (Abramowitz, M., and Stegun, C. A. (Eds.) "Handbook of Mathematical Functions with Formulas, Graphs, and Mathematical Tables, 9th printing". New York: Dover (1972)); most of these techniques are less robust than D-1 in the presence of significant noise, however, they can be used if a particular application suggests it;

D-3 simple difference ("right" and "left", respectively):

$$\hat{D}R(\tau) = \frac{1}{\Delta t} \cdot (R(\tau+1) - R(\tau)) \quad (16)$$

-continued $$\hat{D}R(\tau) = \frac{1}{\Delta t} \cdot (R(\tau) - R(\tau-1)); \quad (17)$$

this estimator is sensitive to even small amounts of noise; such sensitivity can be useful for detecting weak noise in a smooth background of low-dimensional deterministic signals.

D-4 discrete-time dynamical models (e.g. nonlinear regression models)

$$x(i+1) = F_A(x(i), x(i-\tau), \ldots, x(i-\tau_m)) \quad (18)$$

can be incorporated into our model estimation framework by defining the "derivative" to be:

$$\hat{D}R(\tau) \to R(\tau+1); \quad (19)$$

For any given processing chain we assume one algorithm should be used to generate output. This does not restrict a designer from using different algorithms in parallel, and to implement conditional probabilities and complex decision making schemes in a post-processing unit (see below).

To actually compute model coefficients, we compose a vector B of correlation derivatives using correlations with the signal and signal derivative:

$$B = \{\hat{D}R_{x0}(\tau), \hat{D}R_{x1}(\tau), \ldots, \hat{D}R_{xM}(\tau)\} \quad (20)$$

in the case of scalar measurements, or in the case of multi-variate measurements, a set of derivative vectors $\{B^{(j)} | j=1, \ldots, V\}$. The length $L_{eff}$ of the derivative vector is the same as the number of points in the data sample, reduced by the number of points needed to estimate the derivative at the first and the last points. For the model Eq. (9) the vector of correlation derivatives (see Table 5):

$$B = \left\{0, \hat{D}R_{xx}(\tau), 0, \frac{1}{2}\hat{D}R_{x^2x}(\tau), \hat{D}R_{xx^2}(\tau)\right\}. \quad (21)$$

Composing a correlation matrix (FIG. 18, block 104). We define the M×M correlation matrix as an ordered set of correlations:

$$R^{(j)}\{R_{kl}^{(j)}(\tau)|k=0,\ldots,M;l=0,\ldots,M\}, \quad (22)$$

where M is the number of parameters to be estimated for an expansion with M basis functions (see, Eq. (8)). There are V such matrices for each component of the input vector. For the model Eq. (9) the correlation matrix R (Table 5) is $$R = \begin{pmatrix} \langle x^2 \rangle & R_{xx}(\tau) & \langle x^3 \rangle & R_{x^2x}(\tau) & R_{xx^2}(\tau) \\ R_{xx}(\tau) & \langle x^2 \rangle & R_{x^2x}(\tau) & R_{xx^2}(\tau) & \langle x^3 \rangle \\ \langle x^3 \rangle & R_{x^2x}(\tau) & \langle x^4 \rangle & R_{x^3x}(\tau) & R_{x^2x^2}(\tau) \\ R_{x^2x}(\tau) & R_{xx^2}(\tau) & R_{x^3x}(\tau) & R_{x^2x^2}(\tau) & R_{xx^3}(\tau) \\ R_{xx^2}(\tau) & \langle x^3 \rangle & R_{x^2x^2}(\tau) & R_{xx^3}(\tau) & \langle x^4 \rangle \end{pmatrix} \quad (23)$$

$$\equiv \begin{pmatrix} m_2 & r_1 & m_3 & r_2 & r_3 \\ r_1 & m_2 & r_2 & r_3 & m_3 \\ m_3 & r_2 & m_4 & r_5 & r_4 \\ r_2 & r_3 & r_5 & r_4 & r_6 \\ r_3 & m_3 & r_4 & r_6 & m_4 \end{pmatrix}$$

Note that the matrix of Eq. (23) is very symmetric, so that we may need to compute only 9 quantities out of 25.

Estimation of classification features (FIG. 18, block 105). Our classification features, being the estimated coefficients in the model expansion, may be constructed using the equations connecting the dynamical correlations with the correlation matrix. Together they form a generalized set of correlations. We address the task of estimating a vector (or vectors if the input is multivariate) of features $A=\{a_0, a_1, \ldots, a_M\}$ which provides the best fit to the derivative B by the product R·A. This can be done by solving a system of (M+1) linear equations $B^{(j)}=R^{(j)}\cdot A^{(j)}$ for (M+1) unknown coefficients for each j-component of the input. When M=1,2,3,4,5 (such as in the model Eq. (9)) the solution can be expressed analytically by calculating determinants of R and using Cramer's rule. In higher-dimensional cases (more than 5 parameters) the analytic solution is typically not practical and robust numerical methods must be used (see Press, W. H., et al. "Numerical recipes in C: the art of scientific computing" Cambridge University Press, Cambridge, New York, 1988, for LU-decomposition, SVD and other relevant techniques).

As a result of this step, a sample of data consisting of $L_{eff}$ V-dimensional vector or scalar (V=1) measurements is mapped into (M+1)-dimensional feature vector or vectors $A^{(j)}$, which are coefficients of the equations describing the dynamics of the j-th component of the data. If we slide the observation window along the data, we obtain an ensemble of feature vectors $A_i^{(j)}$, i–1, ..., $N_w$, where $N_w$ is the number of windows. In the ideal case of a long ($L_{eff}\to\infty$) noise-free observation and a valid model, the distributions asymptotically approach delta-functions. Correspondingly, short data samples, non-stationarity, noise, and non-exact expansions will spread out the distributions, which then contain information about these effects. The correlation matrix R(τ) and the vector of dynamical correlations B(τ) can also be output as a result of the data processing described above. Its classification capability can be enhanced by letting r change over some range $\tau_{min}$ to $\tau_{max}$ and using the entire function. Thus, the total output of the core processing block for one data window consists of the feature vectors $\{A(\tau)|\tau=[\tau_{min},\tau_{max}]\}$ and correlation matrices $\{R(\tau)|\tau=[\tau_{min},\tau_{max}]\}$ calculated for different values of the delay τ. A typical useful range of delays is [1, $L_{eff}/10$]. Correspondingly, a series of data windows is mapped into feature and correlation distributions, which are subject to post-processing described in the next block.

Feature analysis and post-processing (FIG. 18, block 106).

Starting from this step in the algorithm there are a variety of ways to utilize the estimated feature distributions and correlations, depending on the particular task or application. Because our device is based on a very novel use of the general theory of spatio-temporal evolution of dynamical systems, we cannot possibly foresee all applications and benefits of our invention. Here, we mention a few implementations which were designed by us during testing on simulated and real-world data. More specific device implementations are also given below, where we describe how several embodiments of our invention operate. Here we note that, in general, post-processing of feature distributions can be performed:

F-1 by a human operator observing feature distributions on a computer display, printer, or any other device capable of directly visualizing the feature distributions or their numerical values;

F-2 by using statistical estimators summarizing properties of the feature distributions, such as a t-test for different feature means described below;

F-3 by using classifiers such as that known in the art based on Mahalanobis distances (for example, Ray, S., and Turner, L. F. Information Sciences 60, p.217).

F-4 by building threshold detectors in feature space based on standard signal processing schemes, for example, the Neyman-Pearson criterion (Abed-Meraim, K., Qiu, W., Hua, Y. "Blind System Identification", Proceedings of the IEEE 85(8), p. 1310, 1997; McDonough, R., and Whalen, A. "Detection of Signals in Noise", Academic Press, 1995);

F-5 by comparing theoretically-derived feature distributions (for example, for normally distributed noise) with those estimated from data;

F-6 by matching distributions of features previously estimated from ground truth data, and stored in a database.

F-7 by using previously trained neural net classifiers (for example, Streit, R. L.; Luginbuhl T. E. IEEE Transactions on Neural Networks 5(5), 1994, p.764). In almost all cases several statistical parameters are very useful for characterization of the feature distributions $\{A_i \equiv \{a_1, a_2, \ldots, a_N\} i=1 \ldots N_w\}$. They are:

1. weighted means (centers of distributions):

$$\langle a_j \rangle = \frac{1}{N}\sum_{i=1}^{N_w} \gamma_k a_{ji}, \quad (24)$$

where $\Sigma\gamma_k=n_e$ are weights which can suppress outliers;

2. variances (standard deviations, spread of the distributions):

$$\sigma_{a_j}^2 = \frac{1}{N_w} \sum_{i=1}^{N_w} (a_{ji} - \langle a_j \rangle)^2; \qquad (25)$$

3. significance: $S_j = \langle a_j \rangle / \sigma_{a_j}$;
4. histograms (discrete estimate of the probability density functions): $H(a_j)$.

Histograms are the most widely used density estimator. The discontinuity of histograms can cause extreme difficulty if derivatives of the estimates are required. Therefore, in most applications a better estimator (such as kernel density estimators) should be chosen.

The general theoretical development of the invention above provides a designer with several options for data analyses and algorithm design. Particular assumptions regarding the nature of the observed data allows efficient operation of the invention while maintaining the invention's significant advantage. Preferred embodiments will be specifically addressed below through the description of their operation.

2. General Design Methodologies

In this section, we outline several design methodologies for devices based on the previous general technical description. These design methodologies indicate possible implementations of specific signal processing devices described in the Detailed Description of the Preferred Embodiments section.

2.1 Analog Device for General Signal Discrimination

Goal: Provide discrimination of general scalar input signals based on continuous dynamical models.

Device: Analog Circuit processor with scalar analog inputs.

Model Class: Based on Delay-Differential Signal Model up to quadratic order.

Feature Estimation: Correlation Method.

Post-Processing: Visual inspection of correlation functions, and (optional) statistical t-test for hypothesis testing.

Hardware Requirements: Analog circuit consisting of operational amplifiers and correlators.

Summary: Because the general processing methodology utilizes continuous signal models, it is natural to implement the processing chain as an analog device. Such a device would provide high computational speed and efficiency. Visual inspection of the resulting correlation functions also provides high speed for classification by a human operator, or alternately simple statistical tests can be used to provide simple feature comparisons.

Design Details: The design is outlined in FIG. 19. The functions of the various components are:

Block 301. Analog Data Input Port. In the schematic, the data input stream is denoted by u. It is convenient to normalize data to zero mean and unit variance. Such normalization allows us to avoid large amplitude variations in the processing chain and to make correlations comply with conventional definitions.

Block 302. Transport Delay Generator with adjustable delay time $\tau$, providing a delayed datastream $u(t-\tau)$.

Block 303. Delay Control. Provides a set-up circuit for the Transport Delay Generator. It can be manually controlled by an operator, or automatically tuned using feedback from Blocks 308–312 (the link is not shown).

Block 304–305. Analog Derivative. These two identical blocks take the signal as input and output its time derivative as a transform. Though the function of this block is similar to what is computed in Eq. (?), there are many other possible implementation of this block including known analog circuits based on operational amplifiers. An important variable parameter for this Block is a derivative smoothing range, which is analogous to the parameter d in Eq. (5). It should provide a variable smoothing range for the signal derivative. Without smoothing (weighted integration) the derivative may greatly amplify noise characteristics, which may degrade quality of the computation and visualization in Blocks 308–312 (Correlators).

Block 306–307. Functional Transformation. These two identical blocks take the signal as input and output a given functional transformation f (u), defined as the basis functions of the dynamical model. In the framework of the second order polynomial model defined by Eq. (9), one should set $f(u)=u^2$. This is also a reasonable choice for f(u) as a default. However, the functional form may vary depending on the model under consideration. For example, if the signal is generated by a system with odd-order nonlinearities, it is beneficial to choose $f(u)=u^3$ or $f(u)=\sin(u)$. It is optionally possible to build-in the normalization (removing the mean and scaling the amplitude to unit variance) after the transformation is calculated.

Correlators. Blocks 308–312 are of similar type. They take two inputs $\{u_1(t), u_2(t)\}$ one of which is delayed (by Block 302), and compute the cross-correlation between the inputs:

$$R_{u_1 u_2}(\tau) = \frac{1}{T} \int_{t_0}^{T} u_1(t) u_2(t) dt = \frac{1}{T} \int_{0}^{T} u_1(t) u_2(t-\tau) dt, \qquad (26)$$

where T is the window length or "accumulation time". The Blocks 308–312 output $R_{u_1 u_2}$ for visualization, and/or (optionally) for further post-processing. Optionally, correlators may span a range of delays set by Block 303, such as $[\tau, \tau_{max}]$. In this case, their output will be a function $R_{u_1 u_2}([\tau, \tau_{max}])$ rather than a single number per window T.

Another important function of these blocks is post-processing visualization. The correlation functions can be transformed into a video signal and shown on a monitor for an operator's inspection. There are several parameters in the processing chain (T, d, $\tau$, $\tau_{max}$), which may require tuning by an operator, or by automatic adjustment using a feedback optimization routine discussed below.

Block 308. Auto-Correlator. This Block computes, and stores for possible further processing the Auto-Correlation:

$$R_{uu}(\tau) = \frac{1}{T} \int_{t_0}^{t_0+T} u(t) u(t-\tau) dt. \qquad (27)$$

Block 309. Derivative of Auto-Correlation. This Block computes, and stores for possible further processing the derivative of the auto-correlation:

$$\hat{D}R_{uu}(\tau) = \frac{1}{T}\int_{t_0}^{t_0+T} \dot{u}(t)u(t-\tau)dt. \quad (28)$$

Block 310. Correlation of Functionally Transformed Signal Derivative. This Block computes, and stores for possible further processing the correlation of the functionally transformed signal derivative $$R_{f[\dot{u}]u}(\tau) = \frac{1}{T}\int_{t_0}^{t_0+T} f[\dot{u}(t)]u(t-\tau)dt. \quad (29)$$

This can be specified for a general class of nonlinear models with quadratic coupling as $$R_{\dot{u}^2 u}(\tau) = \frac{1}{T}\int_{t_0}^{t_0+T} (\dot{u}(t))^2 u(t-\tau)dt. \quad (30)$$

Block 311. Correlation of Functionally Transformed Signal. This Block computes, and stores for possible further processing the correlation of functionally transformed signal $$R_{f[u]u}(\tau) = \frac{1}{T}\int_{t_0}^{t_0+T} f[u(t)]u(t-\tau)dt. \quad (31)$$

This can be specified for a general class of nonlinear models with quadratic coupling as $$R_{u^2 u}(\tau) = \frac{1}{T}\int_{t_0}^{t_0+T} (u(t))^2 u(t-\tau)dt. \quad (32)$$

Block 312. Derivative of Correlation of Functionally Transformed Signal. This Block computes, and stores for possible further processing the correlation derivative of the functionally transformed signal $$\hat{D}R_{f[u]u}(\tau) = \frac{1}{T}\int_{t_0}^{t_0+T} u(t-\tau)df[u(t)]. \quad (33)$$

This can be specified for a general class of nonlinear models with quadratic coupling as $$\hat{D}R_{u^2 u}(\tau) = \frac{1}{T}\int_{t_0}^{t_0+T} u(t-\tau)d(u(t))^2. \quad (34)$$

The analog device as a whole can be replicated to process several input data streams in parallel. It can also be used to compute "reverse" correlations. For example, $R_{u^2u}$ has its "reverse" counter-pair $R_{uu^2}$. This can be done simply by putting $\tau<0$ (i.e. advanced variables) in Blocks 302–303. Alternately, this can be done by swapping the delayed and direct circuits.

Simple statistical post-processing can be added to the device to perform two functions:

1. Provide the operator with robust statistical tests to enhance his discrimination capability.
2. Optimize parameters of the computational circuit to obtain the best detection/classification performance, by maximizing the observed confidence intervals in hypothesis testing.

Figure 19:
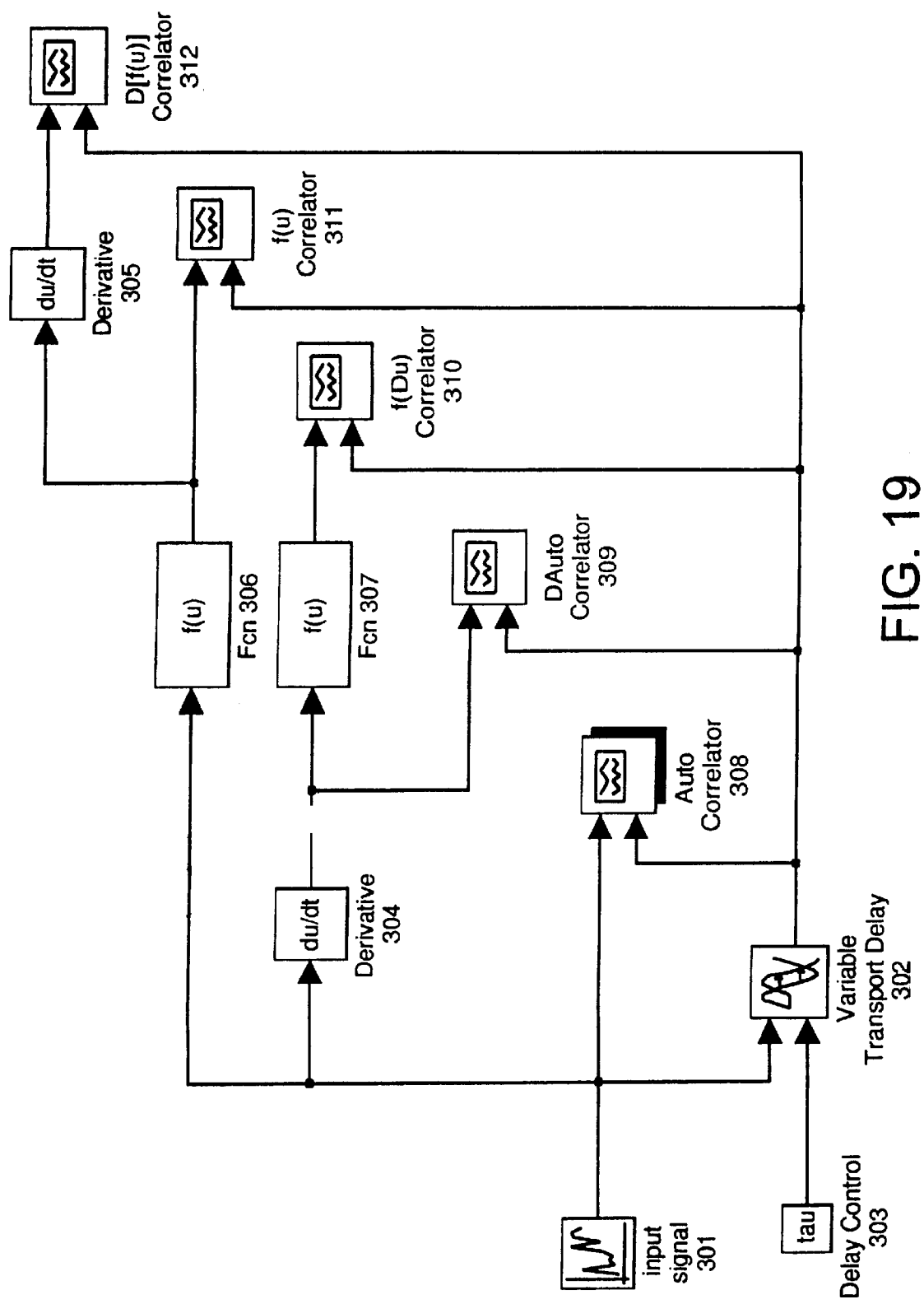
FIG. 19 is a schematic of a general analog signal processor for detecting and classifying deterministic properties of observed data signals using correlation parameters.

To generate statistical testing, consider that we compute M types of correlations (for example, there are 5 types described for Blocks 308–312 in FIG. 19). These constitute the features estimated by the analog device. These features are then taken from the post-processing outputs of Blocks 308–312 (not explicitly shown) and stored in a buffer to compute statistics. After $N_w$ windows of data are processed, we have a set of $N_w \times M$ features. They each can be either vectors (for a range of delays $\tau$) or numbers (single delay).

Suppose we have two sets of features, A and B, estimated from signals 1 and 2. We can test the hypothesis that these two feature distributions have the same means (Press, W. H., et al. "Numerical recipes in C: the art of scientific computing" Cambridge University Press, Cambridge, N.Y., 1988, page 616). First, we can estimate the standard error of the difference of the means for single-feature distributions A and B:

$$\sigma_{AB} = \sqrt{\frac{\sum_{i \in A}(a_1 - \langle a\rangle_A)^2 + \sum_{i \in B}(a_1 - \langle a\rangle_B)^2}{N_A + N_B - 2}\left(\frac{1}{N_A} + \frac{1}{N_B}\right)}, \quad (35)$$

where the sums are over feature distributions A and B, and $N_A$ and $N_B$ are the numbers of features in the distributions, respectively. Then we can compute t by $$t = \frac{\langle a\rangle_A - \langle a\rangle_B}{\sigma_{AB}}. \quad (36)$$

Finally, we can evaluate the significance of this value of t for a Student's distribution with $v = N_A + N_B - 2$ degrees of freedom:

$$I_{\frac{v}{v+t^2}}\left(\frac{v}{2}, \frac{1}{2}\right), \quad (37)$$

where $I_x(y,z)$ is the incomplete beta function. The significance is a number between zero and one, and is the probability that $|t|$ is this large or larger, for distributions with equal means. Therefore, a small numerical value of the significance (typically, 0.05) means that the observed difference is very significant.

2.2 Simple Digital Detector for Determinism and/or Nonlinearity

Goal: Provide detection of possible deterministic structure, and simultaneously nonlinear structure, in a highly noisy digital scalar input signal.

Device: Digital Processor with Scalar Digital Inputs.

Model Class: Delay-Differential Equation Signal Model up to quadratic order.

Feature Estimation: Correlation Method.

Post-Processing: Detection Theoretic threshold detector, specifically a Neyman-Pearson detector, designed using estimated model coefficients (features).

Hardware Requirements: Programmable digital processing unit.

Summary: This design is intended to provide a simple and parsimonious architecture for the detection of unknown deterministic signals (e.g. sinusoids, or broadband nonlinear processes) in highly noisy environments. The model class (a quadratic DDE) can be optimized to particular input signal classes. The output of the processor is the estimated DDE model coefficients, which are then used as features for a detection theoretic threshold method. The Neyman-Pearson threshold detector implemented below provides standard receiver operating characteristic (ROC) curves, summarizing detection performance. Hypothesis testing on input signals is accomplished by simple comparison with the feature threshold.

Design Details: Assume that our input is a scalar signal measured for $L_w$ samples: $\{x(i)|i=1, \ldots, L_w\}$. One can repeat the measurement $N_w$ times to obtain $N_w$ data windows (possibly overlapped). The detector is built using the following components:

1. Pre-processor normalizing data to zero mean and unit variance. We neglect the slight bias between different estimations of averages, e.g. $<x>\approx<x_\tau>\approx<x_{2\tau}>\approx \ldots$, which requires the window length to be long enough $L_w>>\tau$. Then we calculate statistical moments from:

$$\langle x \rangle = \frac{1}{L_w}\sum_{i=1}^{L_w} x(i) \qquad (38)$$

$$\sigma_x = \frac{1}{L_w}\sqrt{\sum_{i=1}^{L_w}(x(i)-\langle x \rangle)^2}$$

$$x(i) = (x(i)-\langle x \rangle)/\sigma_x, i=1,\ldots, L_w \qquad (39)$$

where each window is normalized separately. In the following formulas we remove bar notations, assuming that the input data are properly normalized.

2. We use the DDE model defined by Eq. (9) (D=2, P=2), resulting in 5 features for a pair of delayed coordinates $\{x, x_\tau\}$. Thus, we compose the correlation matrix R (see also Table 5) according to Eq. (23) introduced above. The correlation matrix is very symmetric, so we need to compute only 12 averages:

$$m_2 = \langle x^2 \rangle \approx \langle x_\tau^2 \rangle \approx \frac{1}{L}\sum_{i=1}^{L} x^2(i), \qquad (40)$$

$$m_3 = \langle x^3 \rangle \approx \langle x_\tau^3 \rangle \approx \frac{1}{L}\sum_{i=1}^{L} x^3(i), \qquad (41)$$

$$m_4 = \langle x^4 \rangle \approx \langle x_\tau^4 \rangle \approx \frac{1}{L}\sum_{i=1}^{L} x^4(i), \qquad (42)$$

$$r_1 = R_{xx}(\tau) = \langle xx_\tau \rangle \approx \frac{1}{L}\sum_{i=1}^{L} x(i)x(i-\tau), \qquad (43)$$

$$r_2 = R_{x^2x}(\tau) = \langle x^2 x_\tau \rangle \approx \frac{1}{L}\sum_{i=1}^{L} x^2(i)x(i-\tau), \qquad (44)$$

$$r_3 = R_{xx^2}(\tau) = \langle xx_\tau^2 \rangle \approx \frac{1}{L}\sum_{i=1}^{L} x(i)x^2(i-\tau), \qquad (45)$$

$$r_4 = R_{x^2x^2}(\tau) = \langle x^2 x_\tau^2 \rangle \approx \frac{1}{L}\sum_{i=1}^{L} x^2(i)x^2(i-\tau), \qquad (46)$$

$$r_5 = R_{x^3x}(\tau) = \langle x^3 x_\tau \rangle \approx \frac{1}{L}\sum_{i=1}^{L} x^3(i)x(i-\tau), \qquad (47)$$

$$r_6 = R_{xx^3}(\tau) = \langle xx_\tau^3 \rangle \approx \frac{1}{L}\sum_{i=1}^{L} x(i)x^3(i-\tau). \qquad (48)$$

3. The vector of correlations with a derivative B, Eq. (21), is estimated for the discrete input as:

$$\hat{D}R_{\dot xx}(\tau) = \langle \dot x x_\tau \rangle \approx \hat{D}\frac{1}{L}\sum_{i=1}^{L} x(i)x(i-\tau), \qquad (49)$$

$$\hat{D}R_{x^2\dot x}(\tau) = 2\langle x\dot x x_\tau \rangle \approx \hat{D}\frac{1}{L}\sum_{i=1}^{L} x^2(i)x(i-\tau), \qquad (50)$$

$$\hat{D}R_{\dot x x^2}(\tau) = 2\langle \dot x x_\tau^2 \rangle \approx \hat{D}\frac{1}{L}\sum_{i=1}^{L} x(i)x^2(i-\tau), \qquad (51)$$

where we compute the derivative $\hat{D}$ according to least-squares quadratic algorithm, Eq. (15), with smoothing interval d=5.

4. Finally, a system of 5 linear algebraic equations for the 5-dimensional feature vector $A=\{a_1,a_2 \ldots, a_5\}$ $$R \cdot A = B \qquad (52)$$

is solved using LU-decomposition (Press, W. H., et al. "Numerical recipes in C: the art of scientific computing" Cambridge University Press, Cambridge, N.Y., 1988). In a demanding real-time processing environment one can solve Eqs. (52) analytically and store these functions.

5. We repeat the above steps for each of the NW data windows and estimate a set of feature vectors $\{A_i|i=1, \ldots, N_w\}$.

There are two different operating frameworks for the above device:

1. Detector Design: using known data or data properties, we estimate the feature distributions, calculate appropriate thresholds $\bar{a}_k^{(j)}$, and assess performance characteristics (ROC-curves).

2. Operation of Detector: for a single measurement window we estimate the feature vector $a_k^{(j)}$ and compare the values with the threshold values $\bar{a}_k^{(j)}$, thereby giving a decision criteria.

Detector Design. To design the detector, we repeat the coefficient estimation procedure, Eqs. (38–52), in each of $N_w$ windows of a data set to obtain histograms of features $H(a_k^{(j)})$, j=1,2, k=1, ..., 5. With the ensemble of features or with the set of their histograms we begin detector design.

Estimation of Probability Density. Probability Density Function (PDF) $P_1(a_k^{(j)})$ of the feature distribution is approximated by a normal probability density function using Eq. (?) for the coefficient's mean <a>, and Eq. (25) for the coefficient's variance $\sigma_a$:

$$P_1(a) = \frac{1}{\sqrt{2\pi}\,\sigma_a}e^{-\frac{(a-\langle a \rangle)^2}{2\sigma_a^2}}. \qquad (53)$$

There are several more sophisticated ways to estimate continuous PDF from discrete sets known in the prior art. For example, the kernel density estimation procedure is described V in detail in the book "Density Estimation For Statistical and Data Analysis" by B. W. Silverman (Chapman and Hall, London—New York, 1986). The details are beyond the scope of this description. The "noise" distribution $P_0(a_k^{(j)})$ is also known either from theoretical considerations (see Kadtke, J., and Kremliovsky, M. "Estimating Statistics for Detecting Determinism Using Global Dynamical Models", Physics Letters A 229(2), p.97, 1997) or from a similar estimation procedure as described for the signal in Eqs. (40–52), and approximated by a normal distribution as in Eq. (53).

Calculating Decision Threshold. Once the $P_1(a_k^{(j)})$ and $P_0(a_k^{(j)})$ are estimated one can use a Neyman-Pearson criterion to design a threshold detector (for example, see "Detection of Signals in Noise" by R. McDonough and A. Whalen, Academic Press, 1995). Using a "Probability of Detection", "Probability of False Alarm" framework ($P_d$, $P_{fa}$), the desired $P_{fa}$ is chosen and the threshold a is estimated from the following relation:

$$P_{fa} = \int_a^\infty P_0(a')da', \tag{54}$$

where we substitute $P_0(a)$ approximated by normal distribution using Eq. (53). If a new sample is observed with $a < \bar{a}$ and we know that it belongs either to $P_0(a)$ ("noise") or $P_1(a)$ ("signal"), then the probability of detection of the signal is calculated as $$P_d = \int_a^\infty P_1(a')da', \tag{55}$$

where we require that $P_{fa}$ is not higher than specified for the decision, and the functional form of $P_1(a)$ is taken from Eq. (53).

Assessing Performance Characteristics. To assess detector performance we calculate a Receiver Operating Characteristic (ROC) curve $P_d$(SNR) with different Signal-to-Noise (SNR) ratios. The SNR is defined by:

$$SNR = 20\log_{10}\frac{\sigma_{signal}}{\sigma_{noise}}, \tag{56}$$

where σ is the standard deviation of the indicated component. For each SNR we generate input data and calculate a ($P_d$, $P_{fa}$) pair.

Multi-variate threshold detectors can also be built using several features by implementing either a joint probability framework or simply numerically estimating the $P_d$ by counting events of correct and false detection by trial-and-error.

2.3 Acoustic Signal Calssifier For Multi-Class Vehicle Recognition

Goal: Provide detailed target classification based on linear and nonlinear signal properties, for acoustic signals from various land vehicles.

Device: Digital Processor with Vector Digital Inputs.

Model Class: System of Ordinary Differential Equations, two degrees-of-freedom, quadratic order.

Feature Estimation: Correlation Method.

Post-Processing: Five dimensional feature space with multi-target feature distributions, and a neural net architecture for target class decision output.

Hardware Requirements: Programmable digital processing board.

Summary: This design is intended to provide a simple and parsimonious architecture for the detailed classification of acoustic signatures. The data is derived from mechanical systems (land vehicles) and has known linear and nonlinear properties. We choose to use a signal model consisting of a system of ordinary differential equations, to demonstrate an alternate signal class appropriate to data of mechanical origin. The estimated model coefficients are used to construct a five-dimensional feature space, and a neural net architecture is then used on this space to provide post-processing decision making.

Design Details: Assume for simplicity that our input data is a 2-dimensional state vector (e.g. from 2 sensors) measured over $L_w$ samples: $X = \{x_1(i), x_2(i) | i=1, \ldots, L_w\}$. Note that we can also use one delayed signal as a second component:
$X = \{x_1(i) = x(i), x_2(i) = x(i-\tau) | i+\tau, \ldots, L_w\}$. We can repeat the measurement $N_w$ times to obtain $N_w$ data windows (possibly overlapped). The detector is built using the following components:

1. A pre-processor normalizing data to zero mean and unit variance. For each scalar k-th component of the input $$\langle x_k \rangle = \frac{1}{L}\sum_{i=1}^{L} x_k(i) \tag{57}$$

$$\sigma_{x_k} = \frac{1}{L}\sqrt{\sum_{i=1}^{L}(x_k(i) - \langle x_k \rangle)^2} \tag{58}$$

where $L \equiv L_w$ (each window normalized separately), or alternately L is the total length of the data set. In the following formulas, we then remove bar notations, assuming that the input data are properly normalized.

2. A polynomial expansion (D=2, P=2) used for the model form based on two coupled ordinary differential equations results in 10 features for a 2-dimensional input $\{x_1, x_2\}$:

$$\dot{x}_1 = a_1^{(1)}x_1 + a_2^{(1)}x_2 + a_3^{(1)}x_1^2 + a_4^{(1)}x_1x_2 + a_5^{(1)}x_2^2 \tag{60}$$

$$\dot{x}_2 = a_1^{(2)}x_1 + a_2^{(2)}x_2 + a_3^{(2)}x_1^2 + a_4^{(2)}x_1x_2 + a_5^{(2)}x_2^2 \tag{61}$$

Thus, we compute the correlation matrix as for Blocks 103–104, FIG. 18, of the processing scheme:

$$R = \begin{pmatrix} \langle x_1^2 \rangle & \langle x_1 x_2 \rangle & \langle x_1^3 \rangle & \langle x_1^2 x_2 \rangle & \langle x_1 x_2^2 \rangle \\ \langle x_1 x_2 \rangle & \langle x_2^2 \rangle & \langle x_1^2 x_2 \rangle & \langle x_1 x_2^2 \rangle & \langle x_2^3 \rangle \\ \langle x_1^3 \rangle & \langle x_1^2 x_2 \rangle & \langle x_1^4 \rangle & \langle x_1^3 x_2 \rangle & \langle x_1^2 x_2^2 \rangle \\ \langle x_1^2 x_2 \rangle & \langle x_1 x_2^2 \rangle & \langle x_1^3 x_2 \rangle & \langle x_1^2 x_2^2 \rangle & \langle x_1 x_2^3 \rangle \\ \langle x_1 x_2^2 \rangle & \langle x_2^3 \rangle & \langle x_1^2 x_2^2 \rangle & \langle x_1 x_2^3 \rangle & \langle x_2^4 \rangle \end{pmatrix} \tag{62}$$

This correlation matrix is very symmetric, so we need to compute only 12 averages:

$$\langle x_{1,2}^2 \rangle = \frac{1}{L}\sum_{i=1}^{L} x_{1,2}^2(i), \tag{63}$$

$$\langle x_{1,2}^3 \rangle = \frac{1}{L}\sum_{i=1}^{L} x_{1,2}^3(i), \tag{64}$$

$$\langle x_{1,2}^4 \rangle = \frac{1}{L}\sum_{i=1}^{L} x_{1,2}^4(i), \tag{65}$$

$$\langle x_1 x_2 \rangle = \frac{1}{L}\sum_{i=1}^{L} x_1(i)x_2(i), \tag{66}$$

-continued $$\langle x_1^2 x_2 \rangle = \frac{1}{L}\sum_{i=1}^{L} x_1^2(i)x_2(i), \quad (67)$$

$$\langle x_1 x_2^2 \rangle = \frac{1}{L}\sum_{i=1}^{L} x_1(i)x_2^2(i), \quad (68)$$

$$\langle x_1^2 x_2^2 \rangle = \frac{1}{L}\sum_{i=1}^{L} x_1^2(i)x_2^2(i), \quad (69)$$

$$\langle x_1^3 x_2 \rangle = \frac{1}{L}\sum_{i=1}^{L} x_1^3(i)x_2(i), \quad (70)$$

$$\langle x_1 x_2^3 \rangle = \frac{1}{L}\sum_{i=1}^{L} x_1(i)x_2^3(i). \quad (71)$$

Note that the correlation matrix in our simple polynomial expansion is the same for both model equations (60–61).

3. The vector(s) of generalized correlations $$B^{(1)} = \{0, \langle \dot{x}_1 x_2 \rangle, 0, \langle \dot{x}_1 x_1 x_2 \rangle, \langle \dot{x}_1 x_2^2 \rangle\}, \quad (72)$$

$$B^{(2)}\{\langle x_1 \dot{x}_2 \rangle, 0, \langle x_1^2 \dot{x}_2 \rangle, \langle x_1 x_2 \dot{x}_2 \rangle, 0\}, \quad (73)$$

where these averages are defined by $$\langle \dot{x}_1 x_2 \rangle = \frac{1}{L}\sum_{i=1}^{L} x_2(i)\hat{D}x_1(i), \quad (74)$$

$$\langle \dot{x}_1 x_1 x_2 \rangle = \frac{1}{L}\sum_{i=1}^{L} x_2(i)x_1(i)\hat{D}x_1(i), \quad (75)$$

$$\langle \dot{x}_1 x_2^2 \rangle = \frac{1}{L}\sum_{i=1}^{L} x_2^2(i)\hat{D}x_1(i), \quad (76)$$

$$\langle \dot{x}_2 x_1 \rangle = \frac{1}{L}\sum_{i=1}^{L} x_1(i)\hat{D}x_2(i), \quad (77)$$

$$\langle \dot{x}_2 x_2 x_1 \rangle = \frac{1}{L}\sum_{i=1}^{L} x_2(i)x_1 \hat{D}x_2(i), \quad (78)$$

$$\langle \dot{x}_2 x_1^2 \rangle = \frac{1}{L}\sum_{i=1}^{L} x_1^2(i)\hat{D}x_2(i). \quad (79)$$

and are estimated using the least-squares quadratic algorithm, Eq. (15):

$$\hat{D}x(i) = \frac{3}{d(d+1)(2d+1)\Delta t}\sum_{j=-d}^{j=+d} x(i+j)\cdot j, \text{ with } d = 3. \quad (80)$$

4. Two systems of linear algebraic equations for the feature vectors $A^{(1)} = \{a_1^{(1)}, a_2^{(1)}, \ldots, a_5^{(1)}\}$ and $A^{(2)} = \{a_1^{(2)}, a_2^{(2)}, \ldots, a_5^{(2)}\}$ $$R \cdot A^{(1)} = B^{(1)}, \quad (81)$$

$$R \cdot A^{(2)} = B^{(2)}, \quad (82)$$

which are solved using LU-decomposition, SVD or other relevant techniques (Press, W. H., et al. "Numerical recipes in C: the art of scientific computing" Cambridge University Press, Cambridge, N.Y., 1988).

5. We repeat the above steps for each of the $N_w$ data windows and estimate a set of feature vectors $\{A_i^{(j)} | i=1, \ldots, N_w\}$.

2.4 Acoustic Signal Classifier For Detailed Characterization of Transient (Non-stationary Underwater Signals Goal: Provide detailed waveform classification based on linear and nonlinear signal properties, for transient acoustic echo-location signals from marine mammals.

Device: Digital Processor with Scalar Digital Inputs.

Model Class: Delay-Differential Equation Signal Model up to quadratic order.

Feature Estimation: Least-Squares Optimization.

Post-Processing: Five dimensional feature space with simple operator visualization.

Hardware Requirements: Programmable digital processing board.

Summary: This design is intended to provide a simple and parsimonious architecture for the detailed characterization of transient acoustic signatures. The data is derived from a series of echo-location chirps emitted by dolphins during their target discrimination search. The estimated model coefficients of the DDE model provide detailed characterization of the waveform of each chirp. Because the chirp's waveforms change in time, the model coefficients (features) show a systematic trajectory in the feature space. Simple operator visualization provides insight into this search procedure.

Design Details: This device is designed to process short transient signals (pulses). The design is similar to the "Simple Digital Detector for Determinism and/or Nonlinearity" (Section 2.2). However, here we use least-squares optimization to fit the model instead of the correlation technique. This provides better model estimation for short transient signals, since higher-order cumulants require longer stationary data windows to achieve convergence. For the post-processing stage, we do not build an automated detector, but rather simply visualize the data for the operator's discretion.

1. Same as Step 1 in Section 2.2, Eq. (38–39).
2. Same as Step 2, however, instead of composing a correlation matrix, we compose a design matrix F (see, for example, "Numerical Recipes in C" by W. H. Press et.al., Cambridge University Press, 1992, page 671). It has column elements which are algebraically constructed from input data values, and the different rows represent different instances of observation. The rule used to compose column elements is defined by the expansion given in the right hand side of Eq. (9). The unknown coefficients $\{a_1, \ldots, a_5\}$ in the expansion are classification features which must be estimated as follows: for the input $\{x_1(i), x_2(i) | i=1, \ldots, L_w\}$, where we take $x_1(i) \equiv x(i)$ and $x_2(i) \equiv x(i-\tau)$, the $5 \times L_w$ design matrix F is ($L_w << 5$):

$$F = \begin{pmatrix} 1 & x_1(1) & x_2(1) & x_1^2(1) & x_1(1)x_2(1) & x_2^2(1) \\ 1 & x_1(2) & x_2(2) & x_1^2(2) & x_1(2)x_2(2) & x_2^2(2) \\ \cdots & \cdots & \cdots & \cdots & \cdots & \cdots \\ 1 & x_1(L_w) & x_2(L_w) & x_1^2(L_w) & x_1(L_w)x_2(L_w) & x_2^2(L_w) \end{pmatrix} \quad (83)$$

3. The vector of derivatives $B=\{\dot{x}_1(i)|i=1, \ldots, L_w\}$ is estimated directly from the input signal, using $$\hat{D}x(i) = \frac{3}{d(d+1)(2d+1)\Delta t} \sum_{j=\tau-d}^{j=\tau+d} x(\tau+j) \cdot j, \text{ with } d = 1. \quad (84)$$

4. Finally, a system of $L_w$ linear algebraic equations for the 5-dimensional feature vector $A=\{a_1, a_2, \ldots, a_5\}$ $$F \cdot A = B \quad (85)$$

is solved using Singular Value Decomposition. This technique is especially effective when dealing with systems of singular algebraic equations with more equations than unknowns (Kadtke, J. "Classification of Highly Noisy Signals Using Global Dynamical Models" Physics Letters A 203, 1995).

5. We repeat the above steps for each data window and estimate a set of feature vectors $\{A_i|i=1, \ldots, N_w\}$ indexed by pulse number.

2.5 Spatial Pattern (Image) Recognition Using Dynamical Generator Models

Goal: Provide detailed pattern recognition of 2D digital images based on the dynamical properties of a possible underlying spatio-temporal process.

Device: Digital Processor with Scalar Digital Inputs.

Model Class: Delay-differential equation in the spatial coordinate.

Feature Estimation: Correlation Method.

Post-Processing: Mahalanobis-type statistical discriminator.

Hardware Requirements: Simple programmable digital processing unit.

Summary: This design is intended to provide a simple and parsimonious architecture for the discrimination and classification of 2D digital images. The underlying premise is that some component of the spatio-temporal image structure is generated by a continuous physical or man-made process that can be approximately modeled by a delay-differential equation in the spatial coordinates. The DDE model can therefore capture information about the spatial dynamical coupling using generalized correlations of the image intensities. This type of processing may be particularly appropriate for images generated by natural phenomena, such as SAR of the sea surface.

Data Construction: The synthetic input data consists of a solution to the continuous wave equation restricted to a square domain. The specific equation is given by:

$$\frac{\partial^2 u}{\partial t^2} = \frac{\partial^2 u}{\partial x^2} + \frac{\partial^2 u}{\partial y^2}. \quad (86)$$

The equation is solved in a square domain with Neumann boundary conditions on all boundaries $$\frac{\partial u}{\partial n} = 0. \quad (87)$$

The data may be constructed using the Partial-Differential Equation Toolbox of the Matlab processing environment ("Matlab 5", scientific modeling and visualization software provided by The MathWorks Inc., Natick, Mass. 01760, USA, phone (508)-647-7001).

The algorithmic device we construct has as its data model the DDE of Section 1.1, Eq. (9). However, here we assume the independent variables are all spatial, and we write:

$$\frac{\partial u}{\partial x} = a_1 u(x, y, t) + a_2 u(x - \tau, y, t) + \quad (88)$$
$$a_3 (u(x, y, t))^2 + a_4 u(x, y, t) u(x - \tau, y, t) +$$
$$a_5 (u(x - \tau, y, t))^2,$$

or similarly in the y-direction $$\frac{\partial u}{\partial y} = a_1 u(x, y, t) + a_2 u(x, y - \tau, t) + \quad (89)$$
$$a_3 (u(x, y, t))^2 + a_4 u(x, y, t) u(x, y - \tau, t) +$$
$$a_5 (u(x, y - \tau, t))^2.$$

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. A method for detecting and classifying signals, comprising:

acquiring a data signal from a dynamical system;

normalizing the data signal; and calculating at least one of a nonlinear or dynamical correlation coefficient using the normalized data signal, wherein the calculating of a correlation coefficient includes calculating a correlation between the normalized data signal and a derivative of the normalized data signal.

2. A method for detecting and classifying signals, comprising:

acquiring a data signal from a dynamical system;

normalizing the data signal; and calculating at least one of a nonlinear or dynamical correlation coefficient using the normalized data signal, wherein the calculating of a correlation coefficient includes calculating a correlation between the normalized data signal and an exponent of the normalized data signals wherein the exponent is an integer of 2 or greater.

3. A method for detecting and classifying signals, comprising:

acquiring a data signal from a dynamical system;

normalizing the data signal, wherein the data signal is normalized to zero mean and unit variance; and calculating at least one of a nonlinear or dynamical correlation coefficient using the normalized data signal.

* * * * *